United States Patent [19]

Gorges

[11] Patent Number: 4,936,527
[45] Date of Patent: * Jun. 26, 1990

[54] MOVABLE SEATING SYSTEM FOR AIRCRAFT

[75] Inventor: Frederick J. Gorges, Bellevue, Wash.

[73] Assignee: The Boeing Company, Seattle, Wash.

[*] Notice: The portion of the term of this patent subsequent to Feb. 9, 2005 has been disclaimed.

[21] Appl. No.: 153,261

[22] Filed: Feb. 8, 1988

Related U.S. Application Data

[63] Continuation-in-part of Ser. No. 775,498, Sep. 12, 1985, Pat. No. 4,723,732.

[51] Int. Cl.⁵ .............................................. B64D 11/06
[52] U.S. Cl. .............................. 244/118.6; 248/503.1; 410/105; 410/115; 104/165; 104/248; 105/127; 105/29.1
[58] Field of Search ............... 244/118.1, 118.5, 118.6, 244/137.1–137.4; 248/503.1; 297/344, 243, 332–335; 312/198; 40/74, 75, 104, 105,90, 91, 115; 104/248, 165, 287; 105/127, 29.1; 410/105, 74, 75, 115, 90, 91, 104

[56] References Cited

U.S. PATENT DOCUMENTS

| | | | |
|---|---|---|---|
| 149,073 | 3/1874 | Schreiner | 104/248 |
| 454,306 | 6/1891 | Tobey | 104/248 |
| 861,512 | 7/1907 | Greene | 104/248 |
| 3,938,764 | 2/1976 | McIntyre et al. | 244/118.5 X |
| 4,089,140 | 5/1978 | McIntyre et al. | 244/118.6 |
| 4,114,947 | 9/1978 | Nelson | 248/503.1 X |
| 4,475,701 | 10/1984 | Martin | 244/118.6 |
| 4,723,732 | 2/1988 | Gorges | 244/118.6 |
| 4,771,969 | 9/1988 | Dowd | 244/118.6 |

FOREIGN PATENT DOCUMENTS 2458462  1/1981  France .............................. 244/118.6

Primary Examiner—Joseph F. Peters, Jr.
Assistant Examiner—James M. Kannofsky
Attorney, Agent, or Firm—Hughes & Multer

[57] ABSTRACT

An adjustable seating system particularly adapted for use in a passenger aircraft, where there are a pair of tracks mounted in the floor of the aircraft, and a plurality of seating units mounted to these tracks. Each seating unit has a pair of interconnected traction wheels which have positive engagement with the tracks, so as to avoid skewing of the seating units as these are moved along the tracks. Pivotally mounted locking members lock the rear leg portions of the seating units to the tracks at selected locations. Telescoping track cover members cover the track sections that extend between adjacent seating units.

16 Claims, 15 Drawing Sheets

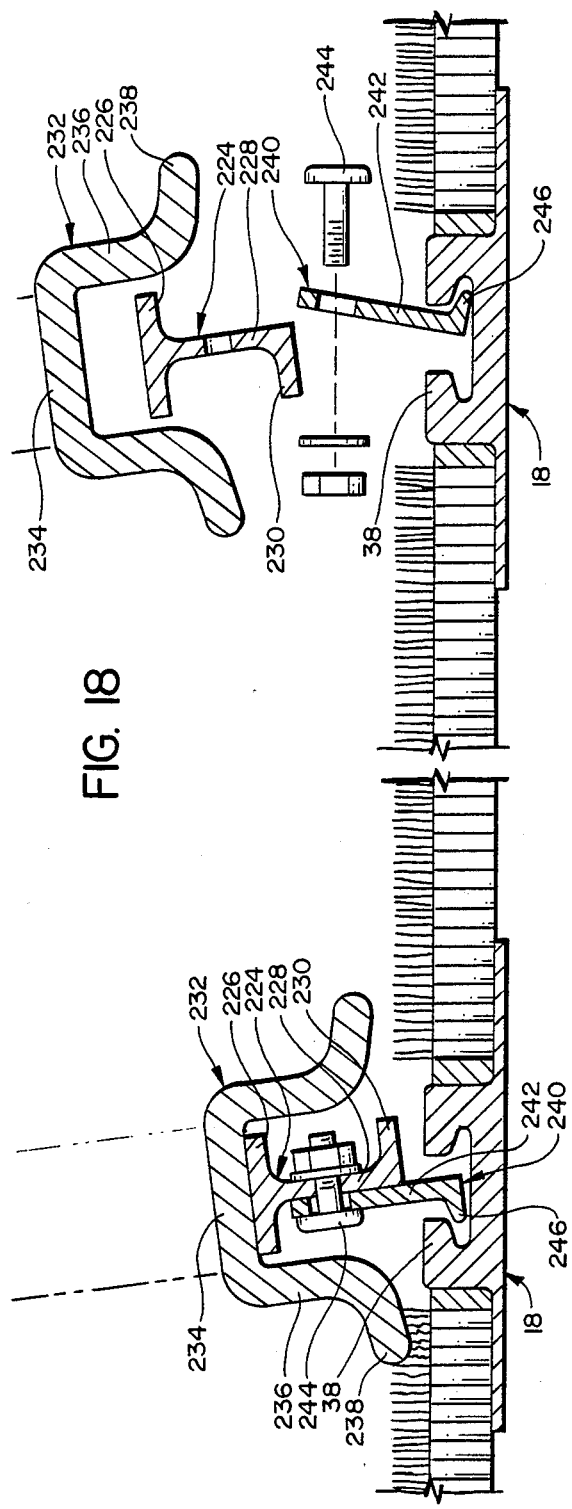
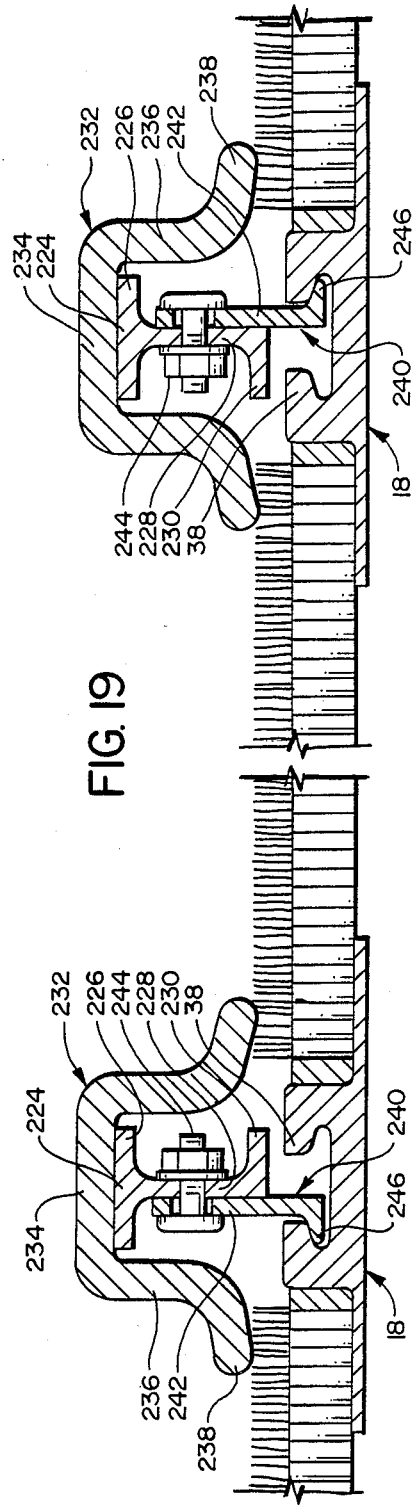
FIG. 18
FIG. 19

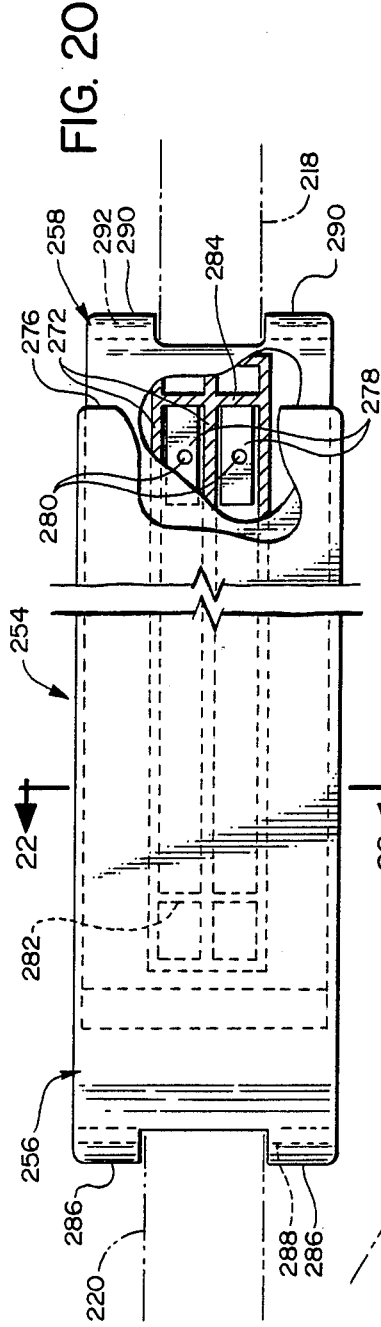
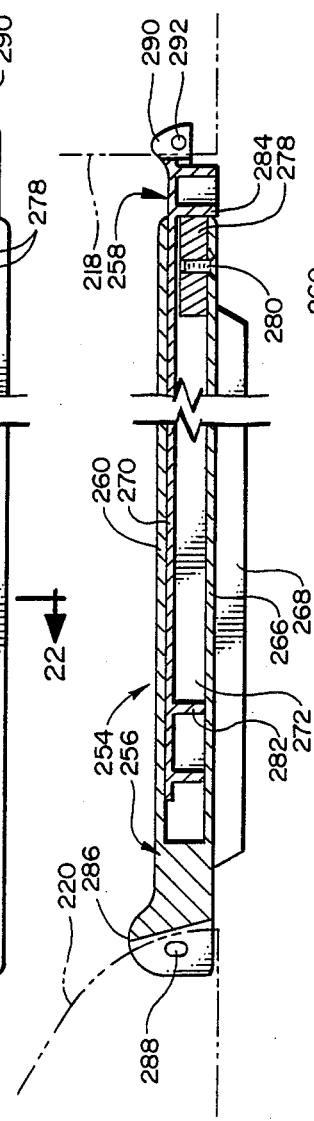
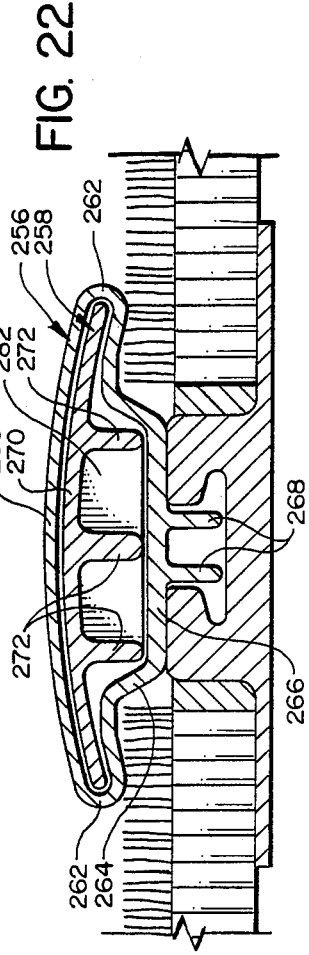

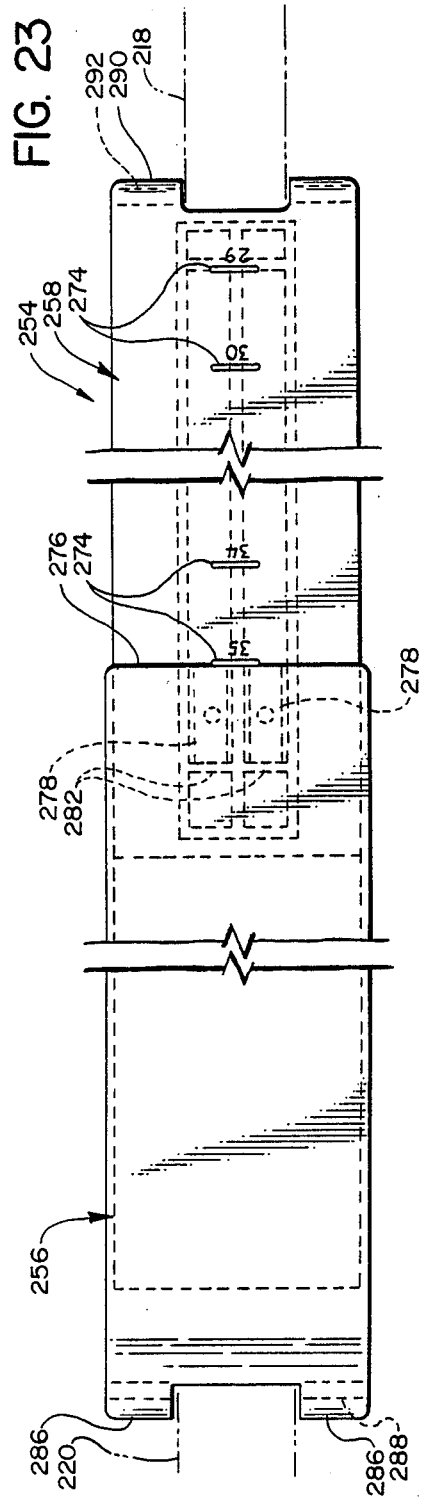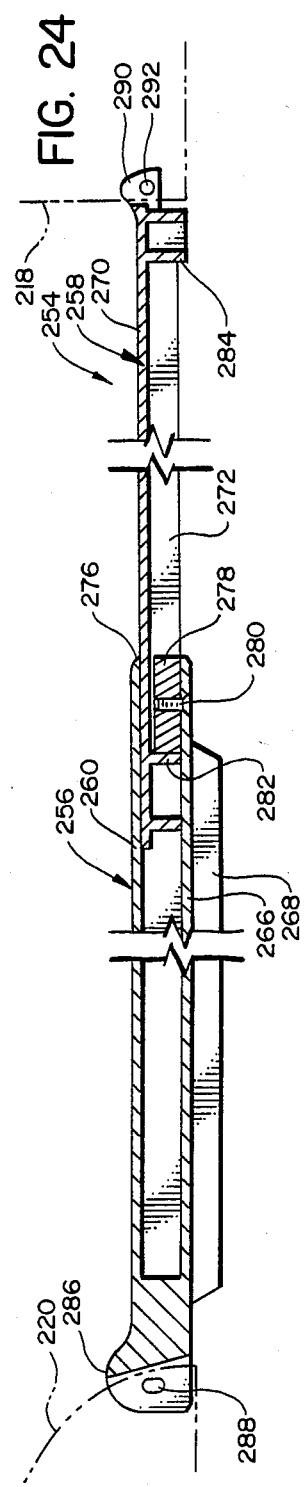

MOVABLE SEATING SYSTEM FOR AIRCRAFT

CROSS REFERENCE TO RELATED PATENTS

This is a continuation in part of U.S. application Ser. No. 775,498 filed Sept. 12, 1985, entitled, "MOVABLE SEATING SYSTEM FOR AIRCRAFT" now U.S. Pat. No. 4,273,732 issued Feb. 9, 1988.

BACKGROUND OF THE INVENTION

1. Field of the Invention

The present invention relates to a seating system particularly adapted for use in an aircraft, and more particularly a seating system where the seat rows can be conveniently moved forwardly or rearwardly to selected locations in the aircraft to adjust the pitch (i.e. spacing) of the seats and in some instances to make additional space for cargo or the like.

2. Background Art

In many modern day commercial passenger aircraft, two or more seats are connected to an undercarriage to make a seat row, and the undercarriage is in turn securely mounted to two underlying longitudinally extending tracks. Normally, the seat undercarriages are mounted to these tracks in a manner that it is a very time consuming operation to unlock the undercarriages from the tracks and move the seats to a different location. Yet, there are many instances where it would be desirable to adjust the location of the seat rows. For example, it may be desirable to adjust the seat row locations for use on certain flights to bring the rows closer together to accommodate more passengers. For other flights where lower density passenger loading is more desirable, the seat rows would be moved back to locations with greater spaces between them. In some instances, it may be desirable to move the seat rows very close together so that room could be made for cargo.

One type of track which is commonly used for mounting seats in passenger aircraft is one where the track has a lengthwise dovetail-shaped passageway, where there are two laterally and inwardly extending flanges or lips that form the upper part of the passageway. At regularly spaced intervals along the length of the track, the two lips or flanges are formed with circularly curved cutouts so that these circular cutouts collectively form vertical circular openings interconnected by narrower elongate rectangular openings.

The seat mounting devices are arranged so that circular foot members at the lower end of the undercarriage are inserted downwardly through the circular openings, and the mounting device is then moved forwardly or rearwardly approximately one-half of the distance of the spacing of the circular openings. This places the foot members beneath related inwardly extending lips of the track member, so that the foot members cannot be moved upwardly while in that location. Then a vertical plunger or shear pin is inserted into an adjacent vertical circular openings to prevent the fitting from being moved forwardly or rearwardly. In one type of such seat mounting and connecting device, there is an "anti-rattle" mechanism which is a threaded member which is mounted on a pivotally mounted member. By moving the threaded member inwardly, the pivotally mounted member is urged in a direction to press the foot member upwardly against the inwardly extending lips of the seat track.

With this prior art seat fastening and mounting system, to move the seat rows to a new location, it is necessary for a workman to assume a position very close to the floor level. The workman unscrews the anti-rattle mechanism of each seat mounting, and then moves the plunger or shear pin to the non-engaged position. After the mounting devices for a particular row of seats are so placed in the unlocked position, the seat row can be moved forwardly or rearwardly a short distance so that the feet members register with adjacent vertically aligned openings in the tracks. Then the seat row can be lifted free of the track and moved to another location, placed into the desired locking position and secured to the tracks. In general, the rearranging of the seat rows in a modern day passenger airliner can be an overnight operation.

A search of the U.S. patent literature has disclosed a number of patents showing various seat systems and mounting devices, and components possibly related thereto. These are as follows:

U.S. Pat. No. 4,475,701 (Martin) shows what is called a "Device for Protecting and Covering a Rail for Fixing the Seats of a Commercial Aircraft." This system has a connection lath 9 which connects the rear foot 1 of a forward seat and the front foot 2 of a rear seat, and this lath 9 has a thick median part 9a. The device for protecting the rail 3 between the rear foot 1 of a forward seat and the front foot 2 of a rear seat comprising a plurality of superposed elements forming a telescopic assembly. There is an upper rail cover 11 having a horizontal upper flat part and two downwardly folded flanges at edge portions thereof. There are two horizontal blades 14 and 15 which have connecting end portions which connect to the bases 8 of the seat units, and free ends which fit within the upper rail cover membet 11.

U.S. Pat. No. 1,438,266 (Schoberle) shows an inclined railway apparatus where the wheels that engage the track have protrusions which assist in traveling up an incline. A similar arrangement is shown in U.S. Pat. No. 1,441,190 (Watson).

U.S. Pat. No. 2,625,118 (Lechner) discloses an aircraft cargo floor where there are rails upon which the wheeled cargo is moved, with cargo retaining members engaging the rails.

U.S. Pat. No. 2,729,352 (Hodges et al) shows a device for moving transferable containers from one surface to another.

U.S. Pat. No. 3,756,544 (Bader) shows a powered system for moving aircraft cargo. There is a coupling dolly on which the pallet or container is loaded and this is operatively associated with the power unit for movement along the track.

U.S. Pat. No. 4,153,312 (Taniwaki) shows a mobile rack system where the racks can be moved from a driving source which has a pair of pedals which are powered by a person. These racks move along rails, and braking means are provided to stop the racks from moving unintentionally.

U.S. Pat. No. 4,379,535 (Baldwin et al) shows a pallet restraint system for use in the cargo bay of an aircraft. This assures equal application of the parachute extraction force and simultaneous release of all load-sensitive latches by means of hydraulic interconnectors.

U.S. Pat. No. 4,369,175 (Long et al) shows a fitting for anchoring an aircraft seat to a seat track. There is a threaded "anti-rattle" fastener for forcing a flanged top portion of a sheer pin against the top of the seat track to prevent rattle. A pivoted lever functions as a cover for the fitting. The lever can lock the sheer pin in its upper disengaged position as the seat fitting is lowered into the seat track and can then be released so that the sheer pin will drop into one of the slots in the seat track automatically as the fitting is moved fore and aft.

German patent 2,841,232 shows demountable seats for an aircraft which are supported by front castors which are pivoted for steering, and by rear castors which retract to drop the frame onto the floor. The frame drops over floor-securing clamps, and it enables rapid conversion between passenger and freight use.

U.S. Pat. No. 4,109,891 (Grendahl) shows a track fitting for anchoring seats or cargo to a slotted floor track of an aircraft. There are lobe portions which are adapted to be positioned so as to underlie retaining portions of the track to restrict upward movement. A sheer pin is arranged to engage the track at locations intermediate of a pair of lobe portions to restrict fore and aft movement.

U.S. Pat. No. 4,114,947 (Nelson) shows a detachable mounting for the seat of a passenger motor bus. There are foward and rear retaining feet which extend into the guideway of the track. There is a locking pin which is urged downwardly in to the guideway of the track and against the bottom of the track to pull the heads of the feet upwardly against the flanges of the track and thus secure the seating device against movement relative to the floor of the bus.

U.S. Pat. No. 4,213,593 (Weik) shows a locking and release system for an aircraft seat. There is a button 16 which fit in the interior channel 20 of a strack member 22. There is a pivotally mount control lever having an elevated release position and a lower locking position.

U.S. Pat. No. 1,922,582, Goodrich, illustrates a system where a number of chairs can be mounted to a rail, which in one embodiment is a telescoping rail. The chairs have wheels which fit into the rails, and pawls are provided to hold the chairs in place. The rail, with the chairs thereon, can be swung upwardly about a back pivot mounting to place the chairs out of the way.

U.S. Pat. No. 2,539,010, Coxx, illustrates a method of moving an aircraft by means of a powered cart which is attached to the wheels of the aircraft.

U.S. Pat. No. 2,735,476, Fieber, shows a crash seat where the seat is mounted on wheels. On impact, the seat moves forwardly and upwardly to absorb the impact of the crash.

U.S. Pat. No. 2,971,566, Negroni, shows a pilot seat for an aircraft, and particularly a helicopter, where the seat is mounted on rollers. Plungers 84 and 84a penetrate holes 90 to hold the seat in a particular position.

U.S. Pat. No. 3,459,134, Shepheard, shows a device to tow an aircraft, where there is a wheel 16 having a number of peripheral lugs 32 that engage holes 34 along a pathway 36, thus insuring positive engagement with the pathway.

U.S. Pat. No. 3,583,322, Vuykukal, shows a restraint device that can be attached to a person who is in a zero gravity environment. This device has rollers which move along a rail.

U.S. Pat. No. 3,805,704, Schauffler, illustrates a transportation system where coupled seats and baggage units for individual passengers are carried by different types of vehicles.

U.S. Pat. No. 3,986,459, Riley, shows a seat mounting structure where there is an underlying track having a lengthwise dovetail-shaped slot with circular vertical openings. Head members fit in the dovetail opening and can be moved to positions between the vertical circular openings to retain the mounting structure to the track. A locking plunger 58 is moved downwardly to engage one of the circular openings to hold the mounting mechanism in its position where it is secured to the underlying track.

U.S. Pat. No. 3,999,630, McPhee, shows an overhead rail system where a carrier for food, snack and beverage service is suspended from the overhead track, with wheels mounted in the track.

U.S. Pat. No. 4,047,689, Grendahl, shows a track fitting where the track is similar to that shown in the Riley patent, U.S. Pat. No. 3,986,459. There are a plurality of lobes which reach outwardly to fit against the inwardly protruding lips or flanges of the track, and shear members fit into the circular openings to hold the fitting in place. The lobe retaining members are arranged in a particular way to obtain a desired distribution of the loads.

U.S. Pat. No. 4,062,298, Weik, shows an anti-rattle device used in the same general type of retaining mechanism that is shown in the Grendahl and Riley patents. In this device, the shear pin that fits in the circular hole is urged downwardly by an angled slot in the shear pin body, this slot being engaged by a pin which is movable fore and aft by rotation of a threaded member to cause the shear pin to be either removed from the floor track or forced against it so as to preload the fitting and prevent it from rattling.

U.S. Pat. No. 4,157,797, Fox, shows a seating assembly for an aircraft where the seats are placed on longitudinally extending rails, and the seat members are mounted on rollers that permit the seats to be moved along the rails. This seat can be locked in various positions by means of vertically movable latch mechanisms which fit into expanded openings in the track.

U.S. Pat. No. 4,229,040, Howell et al, shows a seat support structure where the seat legs have what are called bifurcated lower ends which can accommodate a seat track locking fixture in supporting members that are fixed to the leg structure to furnish added rigidity.

U.S. Pat. No. 4,376,522, Banks, shows a securing member for an aircraft seat, where the track has the same general configuration as the Riley and Grendahl patents. A lever moves a plunger 38 downwardly into the circular opening to hold the securing device in place. There is a spring clip which holds the lever in its down position. This spring clip can be rotated away from the lever to free the spring clip and permit the lever to be moved upwardly.

U.S. Pat. No. 4,396,175, Long et al, shows the same type of track as in the Riley and Grendahl patents. There is a lever which moves the locking plunger downwardly to secure the seat mounting mechanism to the track. There is a threaded anti-rattling member which must be unscrewed to a location to permit the lever to be moved to move the plunger to its nonlocking position.

U.S. Pat. No. 4,475,701, Martin, shows a telescoping cover member which is fitted onto the exposed portion of the track that extends between the front leg of a rear seat to the rear leg of a forward seat.

U.S. Pat. No. 4,496,271, Spinosa et al, shows a fitting to be used in a track such as that shown in the Riley and Grendahl patents. This fitting has a lower portion with outwardly extending locking members. This lower portion is slidable into its locking position.

In view of the foregoing, it is an object of the present invention to provide a convenient and reliable seating system for a passenger aircraft or the like, where the seats can be quickly and effectively moved to different locations to provide different seating arrangements and/or additional space for cargo or other purposes.

SUMMARY OF THE INVENTION

The adjustable seating system of the present invention is particularly adapted for use in a passenger vehicle, and more particularly adapted for use in a passenger aircraft.

There is a track assembly having a longitudinal axis and comprising at least two tracks, each having a related lengthwise axis parallel to the longitudinal axis. Each track comprises a pair of laterally spaced flange members extending along the lengthwise axis and reaching laterally toward one another to form a related track passageway which extends along the lengthwise axis of the track.

The two flange members of each track are formed with lateral recesses which provide enlarged openings that are positioned at regularly spaced intervals along the lengthwise axis. The enlarged openings are interconnected by narrower openings defined by related retaining flange portions positioned between related adjacent pairs of enlarged openings.

There is a plurality of seating units mounted to the track assembly along the longitudinal axis. Each seating unit has a traction wheel assembly comprising at least two traction wheels, each of which engages a related one of the two tracks. Each traction wheel has a peripheral portion with a plurality of protrusions positioned and spaced relative to one another so as to match positioning and spacing of the enlarged openings of its related track. The traction wheels of each assembly are operatively interconnected in a manner that rotation of a first one of the traction wheels causes a corresponding rotation of a second one of the traction wheels so that with the two traction wheels engaged with their related tracks, rates of travel of the two wheels over their related tracks are equal.

Each seating unit has at least two mounting and locking assemblies, each of which operatively engages a related one of the two tracks. Each mounting and locking assembly comprises a retaining foot member connected to the seating unit and having at least one foot positioned within the track passageway of its related track. The foot is adapted to engage selected related retaining flange portions of its related track.

Each mounting and locking assembly also has a locking member having a locking element which is mounted to the retaining foot member (desirably pivotally mounted at a first pivot location) for movement between a locking position where the locking element is positioned in one of the enlarged openings to prevent fore and aft movement of the mounting and locking assembly, and a release position where the locking element is removed from the enlarged opening. The locking member is arranged relative to the retaining foot member so that with the locking member in its locking position, the foot is positioned beneath at least one of the retaining flange portions.

In the preferred form, the locking member is further arranged so that movement of the locking member to the locking position causes the locking member to have an operative lifting engagement between its related track and the related foot member to press the retaining foot member upwardly against the retaining flange portions. This prevents rattling motion of the mounting and locking assembly.

Each seating unit has locking and unlocking actuating means operatively connected to the locking members of the seating unit to move the locking members between their locking and release positions. Thus, the seating units can be moved to selected locations by moving the actuating means of the seating units which are to be moved to the unlocking position, and then moving the seating units along the track assembly.

Preferably, there are a plurality of track cover assemblies, each track cover assembly comprising at least two telescoping cover members. Each track cover assembly is positioned over a related track section that extends between adjacent seating units.

In the preferred form, the cover members of each track assembly have interengaging stop means which limits telescoping movement of the two track cover members towards and away from one another. One of the cover members is connected to one seating unit, and a second of the cover members is connected to one seating unit, and a second of the cover members is connected to a second adjacent seating unit.

In a preferred form, at least some of the track cover members have spaced marking means thereon, corresponding to the spacing of the enlarged openings of the track. Thus, with one seating unit being properly positioned relative to the track assembly for locking engagement thereto, an adjacent one of the seating units can be positioned in accordance with the marking means on the track cover assembly so as to be properly positioned for locking engagement to the track assembly.

Desirably, the system is arranged to provide minimum and maximum spacing distances between adjacent seating units. The stop means of the cover assemblies are arranged to limit relative travel between adjacent seating units to said minimum and maximum distances.

In one form, the system further comprises a power unit adapted to operatively engage and cause rotation of at least one traction wheel of one of the traction wheel assemblies to cause movement of the related seating unit.

In the preferred form, roller means is positioned adjacent each mounting and locking assembly. Each of the roller means is positioned in a manner that movement of its related locking member of the mounting and locking assembly to the release position brings the roller means into bearing engagement with its related track. This facilitates movement of the seating unit.

Desirably, the actuating means comprises a manually operated lever positioned adjacent the seating unit. In a modified embodiment, the actuating means is combined with the track cover member so that the track cover member itself functions as a manually operated lever to move the locking member between its engaged and disengaged position.

The preferred configuration of the mounting and locking assembly is such that the locking member has a downwardly facing cam surface which engages an upwardly facing surface of the track member. The cam surface is arranged in a manner that rotational movement of the locking member to its locking position causes camming engagement of the cam surface to raise the retaining foot member.

In the specific embodiments shown herein, the mounting and locking assembly further comprises actuating rod means pivotally connected to the locking member at a second pivot location spaced from the first pivot location. The actuating rod means is operatively connected to the locking and unlocking actuating means.

In a first specific embodiment shown herein, the cam surface is positioned intermediate the first and second pivot locations on said locking member.

In the method of the present invention, there is provided apparatus such as that described above. To rearrange the positioning of the seating units, the locking and unlocking actuating means of the seating units which are to be moved are moved to their unlocking positions. This leaves each seating unit supported by the traction wheel assembly and the roller means. Then, the seating units can be moved either under power or manually to the desired location.

With the telescoping cover members interconnecting the seating units, and with these telescoping cover members being provided with appropriate stop means, movement of one seating unit can be utilized to move other of said seating units through the action of the track cover members which also function as seat unit spacing members.

In the preferred form, when one of the seating units is locked in place, adjacent seating units can be properly positioned relative to the enlarged openings of the tracks, by use of the markings on the cover members.

In another embodiment, the seat unit is provided with first and second anti-derailment bar means to engage the first and second track members. At the lower edge portion of each anti-derailment bar means, there is a laterally extending retaining lip which engages a flange of the related track member. Each anti-derailment bar means has a sufficient lengthwise dimension so as to provide an aligning function relative to the track member, in addition to preventing upward movement of the seat unit away from the track member. Thus, the mounting and locking assemblies can be in their release positions, with the seats being moved along the tracks, and the seat units will remain securely engaged to the track members.

Other features of the present invention will become apparent from the following detailed description.

BRIEF DESCRIPTION OF THE DRAWING

FIG. 18 is a sectional view taken at the location of line 19—19 of FIG. 16, showing the manner in which one seat row is installed with the anti-derailment bars;

FIG. 19 is a view similar to FIG. 18, taken along line 19—19 of FIG. 16, showing the undercarriage properly mounted to the tracks, and with the anti-derailment bars in proper retaining and aligning engagement with the tracks;

FIG. 20 is a top plan view of one track cover/pitch control unit of this fourth embodiment, with the telescoping members in their shortened position;

FIG. 21 is a view partially in section, taken along a longitudinal vertical plane of the unit of FIG. 20;

FIG. 22 is a sectional view taken along line 22—22 of FIG. 20;

FIGS. 23 and 24 are views similar to FIGS. 20 and 21, respectively, showing the track cover/pitch control assembly in its extended position.

DETAILED DESCRIPTION OF THE PREFERRED EMBODIMENTS

Figure 1:
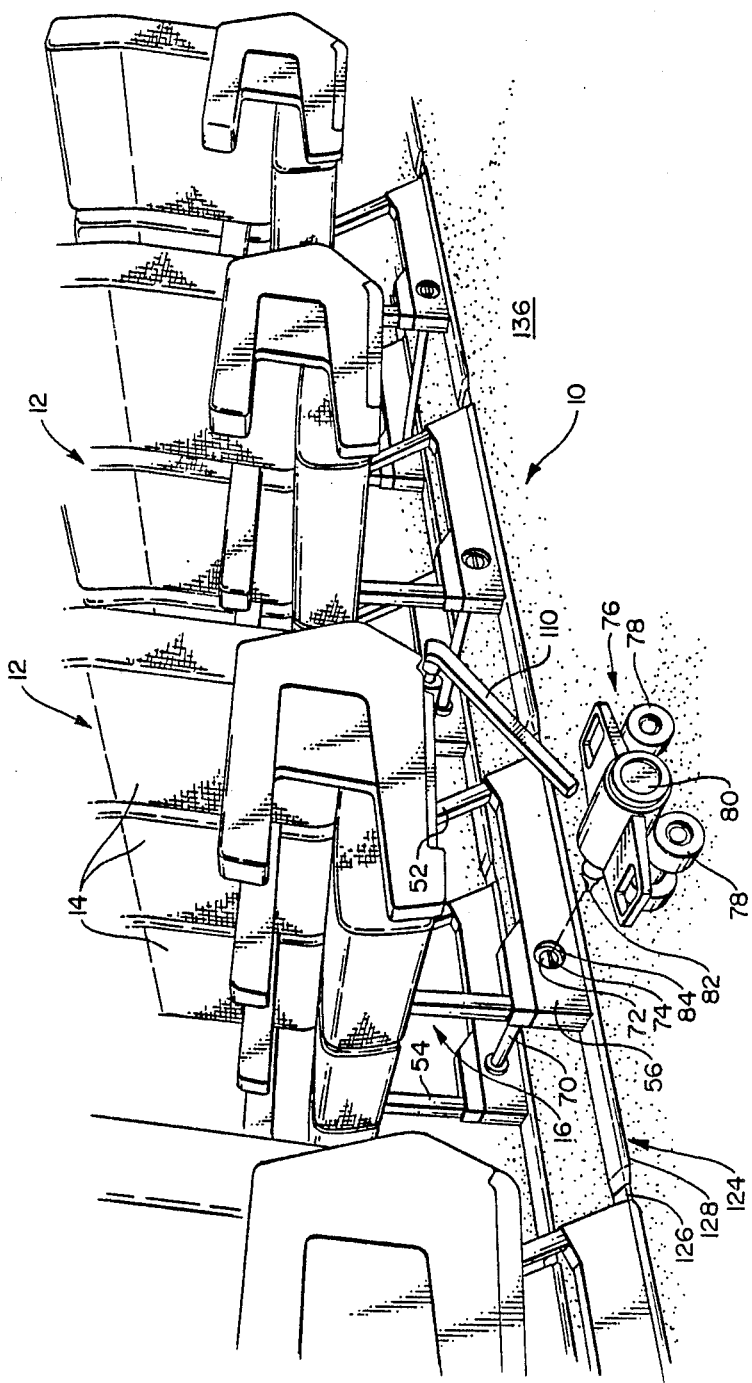
FIG. 1 is an isometric view illustrating a first embodiment of the seating system of the present invention.

With reference to FIG. 1, the seating system of the present invention, generally designated 10, comprises a number of seat rows 12, each of which, in this particular embodiment, is made up of three seats 14. The three seats 14 of each row are mounted on a seat frame or undercarriage 16, which in turn is movable mounted to a pair of longitudinally extending tracks 18.

The undercarriage 16 comprises a main frame 20 to which the seats 14 are directly mounted, a pair of forward mounting members 22, a pair of rear mounting and locking assemblies 24, and a traction wheel assembly 26.

Figure 3:
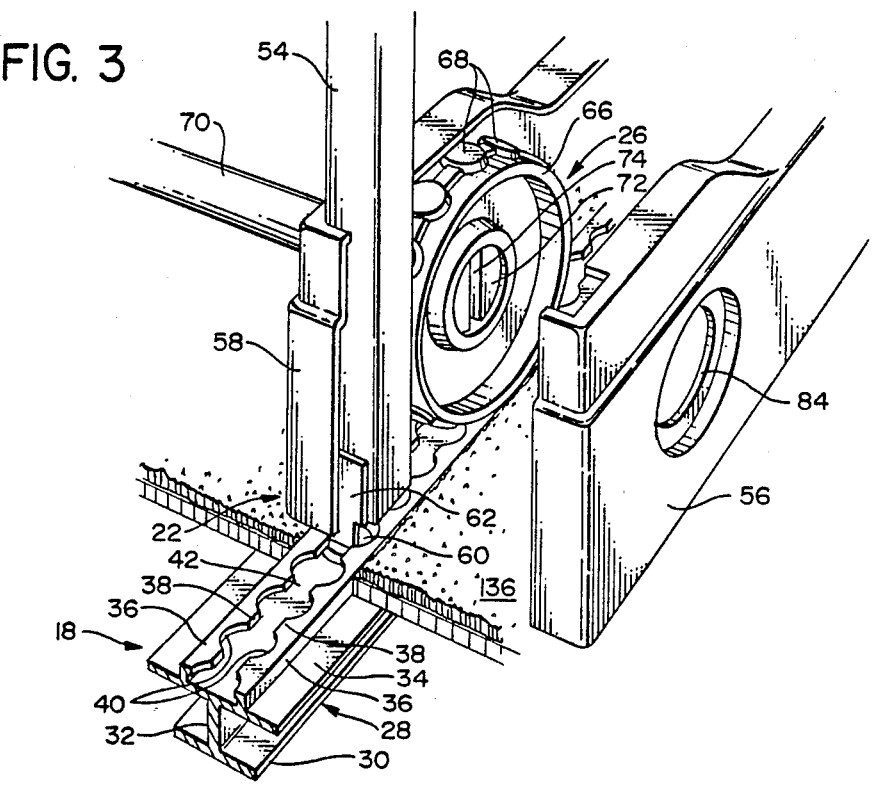
FIG. 3 is an isometric view of the forward mounting portion of one seat row, and also showing one of the two traction wheels provided for each of the seat rows.
Figure 4:
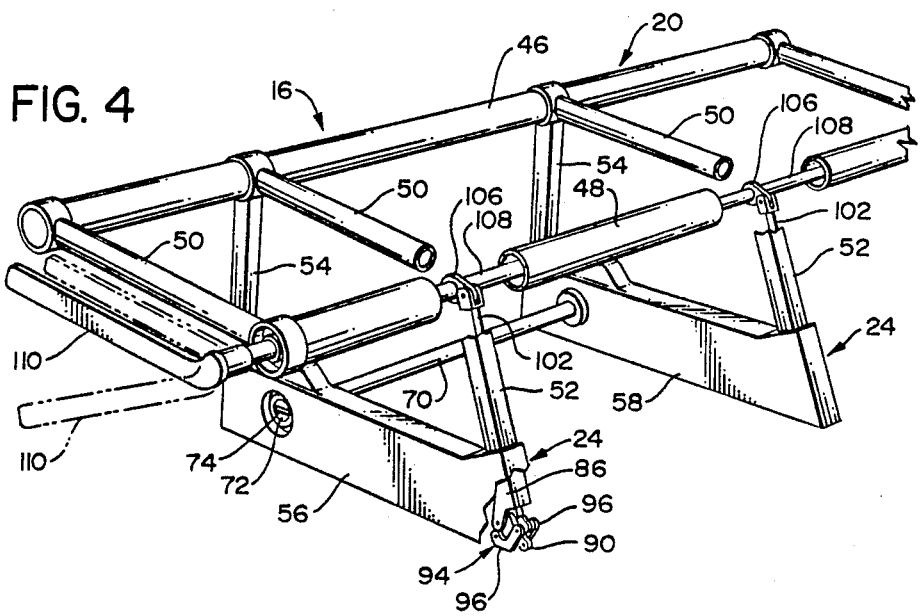
FIG. 4 is an isometric view of a single undercarriage of one seat row, with portions thereof being broken away for clarity of illustration.

With reference to FIG. 3, each track 18 has a main structural portion in the form of an I-beam 28, comprising a lower flange 30, a vertical web 32, and an upper flange 34. Extending upwardly from the upper flange 34 are two "inverted L-shaped" members 36, each of which has a laterally and inwardly extending lip or flange 38, with the two flanges of each track being spaced a moderate distance from one another. The two flanges 38 are provided with matching circular recesses 40 which collectively form a plurality of vertically aligned and longitudinally spaced vertical through circular openings 40—40. Thus, each pair of adjacent openings 40—40 is connected by a related rectangular connecting opening 42.

Track members 18 such as described above (and comprising components 28-42) have existed in the prior art for a number of years, and are present in many modern day passenger aircraft. As discussed previously herein, the common prior art method of mounting the seat rows 12 to these tracks 18 is a very time consuming and labor intensive operation. As will be disclosed in more detail later herein, the present invention is particularly adapted to be used in conjunction with the prior art track members 18.

The undercarriage 16 has an upper rectangular frame portion, made up of forward and rear, laterally extending, tubular frame members 46 and 48, respectively, and a plurality of longitudinally aligned cross members 50. There are two downwardly and rearwardly extending rear legs 52, and two substantially vertically aligned forward legs 54, with the lower ends of the legs 52 and 54 terminating above respective tracks 18. A pair of fairing members 56 and 58 connect to and extend between each forward leg 54 and its related rear leg 52 at the lower ends thereof. The elements of the undercarriage can be made as separate elements joined to one another or as a single integral member.

Figure 8:
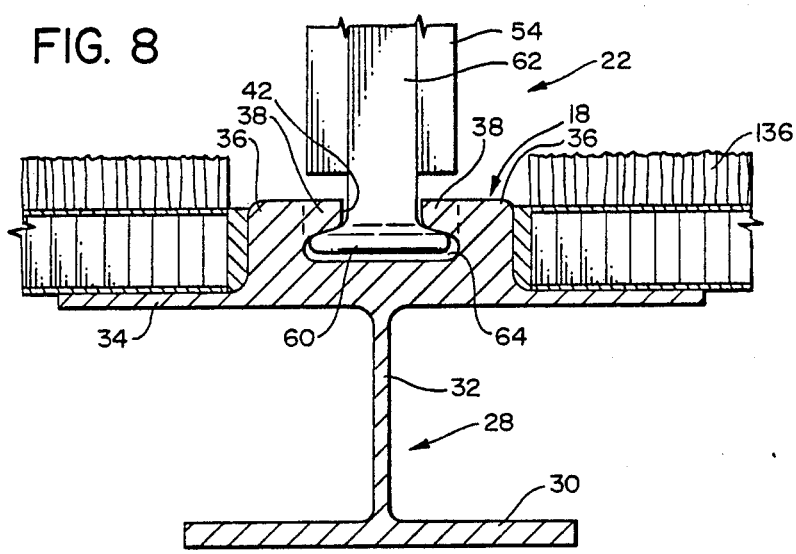
FIG. 8 is a sectional view taken along line 8—8 of FIG. 5, and showing a front mounting foot of the present invention.

With reference to FIGS. 3 and 8, it can be seen that each forward mounting member 22 comprises a circular horizontally extending foot 60 that is connected to a vertical plate or post 62 that is in turn connected to the lower end of the front leg 54. This foot 60 is sized so that it can pass through one of the circular openings 40—40, but is sufficiently wide so that when it is under a pair of inwardly protruding lips 38, it remains secured in the track passageway or slideway 64 defined by the upper flange 34 and the two inverted L-shaped members 36.

Figure 5:
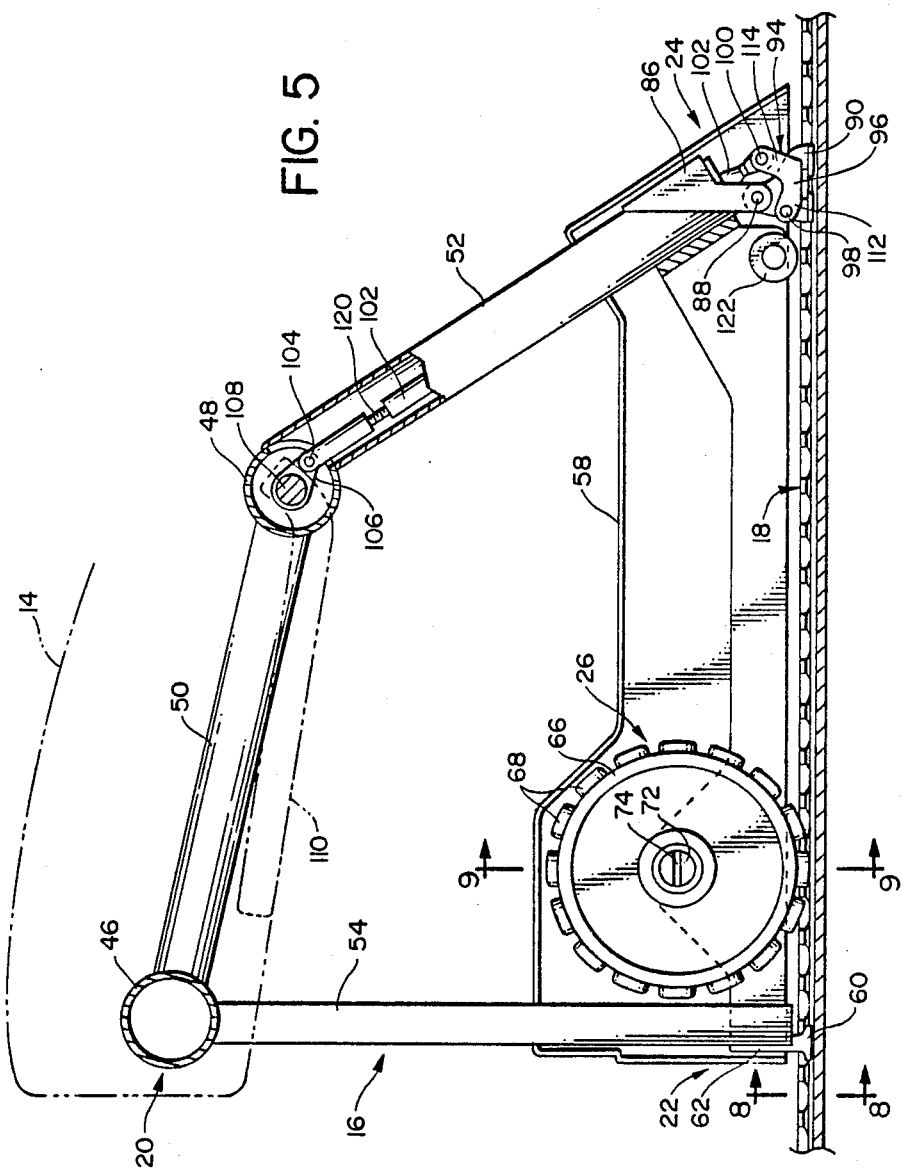
FIG. 5 is a side elevational view of the undercarriage of FIG. 4, with portions thereof being removed for clarity of illustration.
Figure 9:
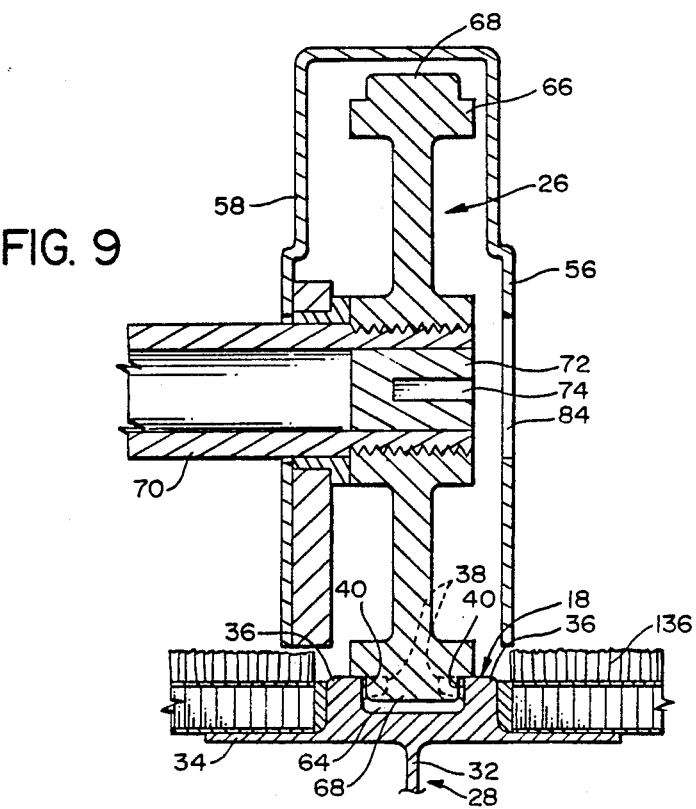
FIG. 9 is a view taken along line 9—9 of FIG. 5, and showing one of the two traction wheels used for one seat row.

With reference to FIGS. 3, 5 and 9, the traction wheel assembly 26 comprises a pair of traction wheels 66 each of which has its periphery formed with a plurality of evenly spaced, outwardly protruding circular lugs 68, and each of which travels over a related track 18. These lugs 68 each have a circular configuration matching that of the circular track openings 40—40, and the spacing of the lugs 68 matches the spacing of the circular openings 40—40. Thus, each wheel 66 moves along its related track 18 with the lugs 68 fitting in the openings 40—40 in sequence for positive engagement. Each traction wheel assembly 26 comprises two traction wheels 66, with each pair of wheels 66 being rigidly interconnected by a laterally extending cylindrical shaft 70 located beneath forward parts of the seats 14 a short distance above the aircraft door.

The end of the shaft 70 which is adjacent an aisle of the aircraft is provided with an interior plug 72 which is fixed to the shaft and has a transverse slot 74 which is adapted to receive a flat drive member in driving engagement.

As illustrated in FIG. 1, there is a drive unit 76 mounted to a set of four wheels 78 which are driven by a motor 80 which can be battery powered. The drive unit 76 has a rotatable drive member 82 which can be inserted into the shaft slot 74 in driving engagement. The inside fairing member 56 (the one adjacent the aisle) is provided with a through opening 84 to provide access to the drive slot 74 of the shaft 70. Thus, the drive unit 76 is able to cause rotation of the two traction wheels 66 to move the related seat row 12 forwardly or rearwardly.

Alternatively, each seat row 12 can be manually pushed forwardly or rearwardly. In either case (whether manually powered or powered by the unit 76), the fact that the two traction wheels 66 are rigidly interconnected by the shaft 70 insures that the wheels 66 of each traction wheel assembly 26 will rotate at the same rotational speed. This insures that the movement of each seat row 12 will proceed evenly, without any skewing of the seat row 12.

As another option, the drive members could be mounted directly to the undercarriage 16, so that each seat row could have its own built-in power unit. These power units could be controlled from a single control location, and the control system could be computerized to cause movement of the seat rows in accordance with programmed patterns.

To describe the two rear mounting and locking assemblies 24 that are provided for each seat row 12, reference is now made to FIGS. 2, 6, 7, 10 and 11. The lower end of each of the two rear legs 52 is fixedly connected to a lower end mounting structure 86 which in turn is pivotally connected at 88 to a retaining foot member 90. As its name implies, this foot member 90 has forward and rear retaining feet 92, each of which has generally the same configuration as the previously described front foot 60. Thus, each of these retaining feet 92 has a generally circular configuration so that it can move vertically through each of the circular track openings 40—40. However, when the retaining foot member 90 is positioned so that the two feet 92 are located immediately below respective rectangular connecting openings 42, the two retaining feet 92 are held to the related track 18 by the track lip or flange portions 38 positioned immediately above. The main body portion of the foot retaining member 90 has a width moderately smaller than the width of the rectangular connecting openings 42. This permits each seat row 12 to be moved forwardly and rearwardly while the feet 92 remain in the passageways 64 of the two tracks 18.

Each rear mounting and locking assembly 24 further comprises a locking member 94 made up of two elbow-shaped plate members 96 which are pivotally connected at their forward end at 98 to the related retaining foot member 90. The upper rear end of the two plate members 96 are pivotally connected at 100 to the lower end of an actuating rod 102 positioned in a related rear leg 52. The upper end of this rod 102 is pivotally connected at 104 to a related actuating arm 106. The two actuating arms 106 of the two rear mounting and locking assemblies 24 are both fixedly connected to a shaft 108 that is positioned within the rear tubular frame member 48 for limited rotation therein. The inside end of the shaft 108 (i.e. that end of the shaft closer to the aisle of the airplane) is in turn connected to an elongate locking and unlocking handle 110.

As indicated previously, the two plate members 96 that make up the locking member 94 each have an elbow-like configuration. Thus, there is a lower forwardly extending portion 112 and a rear upwardly extending portion 114. At the lower edge of each of the lower portions 112, there is a laterally extending arcuate plug or locking portion 116 that matches the contour of the circular openings 40 of the track 18.

Figure 2:
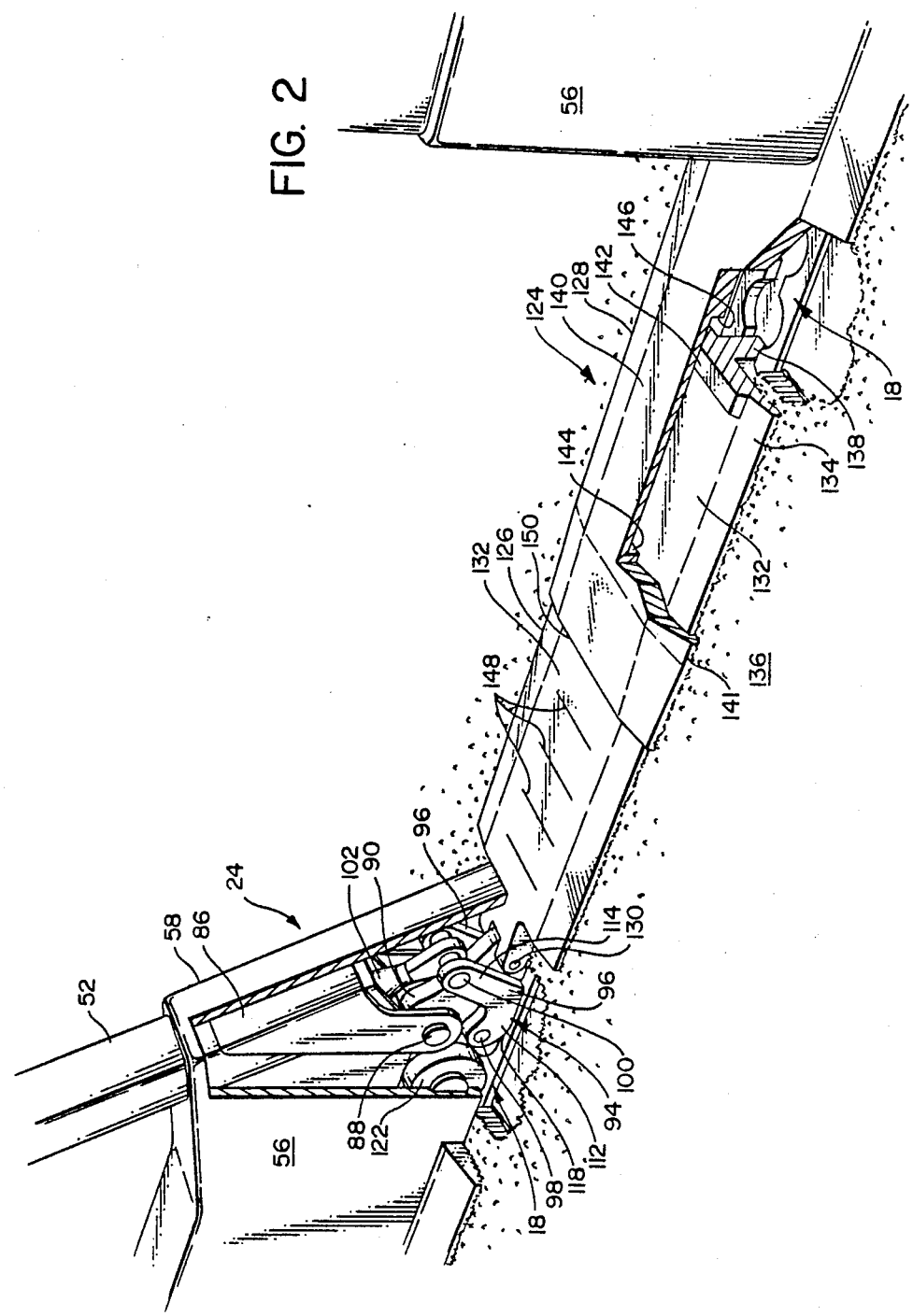
FIG. 2 is an isometric view of one of the rear leg mounting portions of the system of FIG. 1, with portions thereof being broken away for clarity of illustration.
Figure 6:
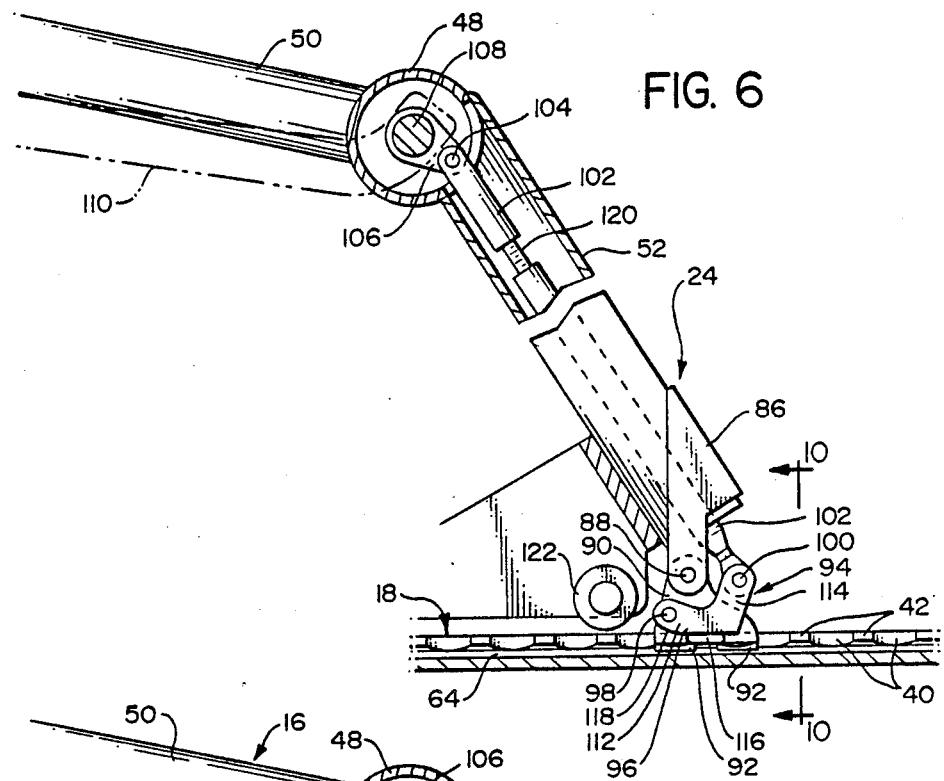
FIG. 6 is a view similar to FIG. 5, illustrating the rear mounting and locking assembly of the undercarriage of FIG. 5, with the locking member being in its secured position.
Figure 7:
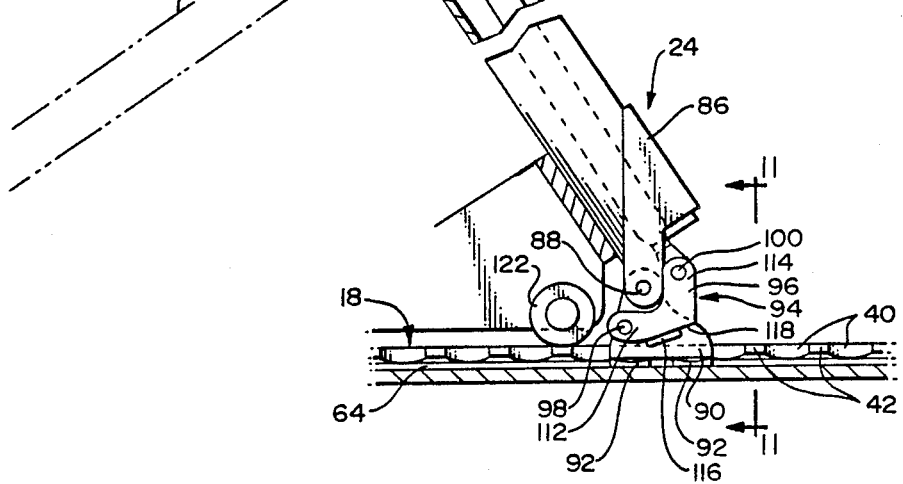
FIG. 7 is a view similar to FIG. 6, but showing the locking member in its released position.
Figure 10:
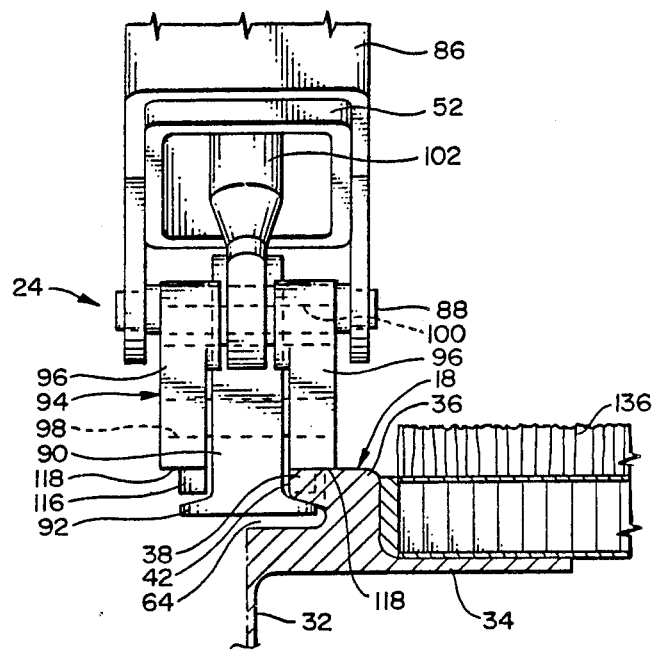
FIG. 10 is a view taken at the location of line 10—10 of FIG. 6, showing the rear locking member in its secure or locked position.

The rear mounting and locking assembly 24 has a locked position where the locking member 94 is rotated downwardly to the position shown in FIGS. 2, 6 and 10. In this position, the two plug or locking portions 116 fit within a related circular opening 40 in the track 18. Further, in the locked position, the locking and unlocking handle 110 is positioned horizontally against the lower side of one of the horizontal seat portions of one of the three seats 14. In this seat locking position, the handle itself can be locked in place by, for example, a key operated lock which could only be unlocked by one of the attendants in the airplane. This would prevent the accidental unlocking of the seat row 12.

Another significant feature of the present invention is that the locking member 94 is so arranged that when it is in its locked position, the retaining foot member 90 is urged upwardly so that the two retaining feet 92 press upwardly against the track lip or flange portions 38 that are positioned immediately above. (This can best be seen with reference to FIGS. 10-11. In the locked position of FIG. 10, it can be seen that the foot 92 is engaging the lip 38—the other lip 38 not being shown for ease of illustration. In the unlocked position of FIG. 11, the foot 92 is positioned in the track slot or slideway 64 so as to be substantially out of engagement with the adjacent surfaces of the track 18.)

This engagement of the feet 92 with the lips 38 is accomplished by reason of the lower surface portions 118 of the plate member 96 being formed as cam surfaces that are pressed against the upper surface of the lips or flanges 38 of the track 18. These surface portions 118 function in the manner of a fulcrum so that the downward and rearward force exerted by the actuating rods 102 at the pivot location 100 causes the forward pivotal connection 98 of the two plate members 96 of the locking member 94 to be urged upwardly to lift the retaining foot member 90 a short distance upwardly. This engagement of the foot members with the lips 38 prevents any "rattling" in the rear mounting and locking assembly 24. Thus, it can be appreciated that the "anti-rattle" feature of the present invention is accomplished simply by moving the locking and unlocking handle 110 upwardly into its locked position, with the locking motion simultaneously causing the retaining feet 92 to be moved into their snug engaged position against the adjacent lips 38 and also to insure proper placement of the locking portions 116.

Each actuating rod 102 has a threaded adjustment device 120 by which the length of that rod 102 can be changed in very small increments. This is to insure that there is the proper engagement of the lower surface bearing portion 118 so that there is snug engagement of the retaining feet 92 against the lips or flanges 38.

Figure 11:
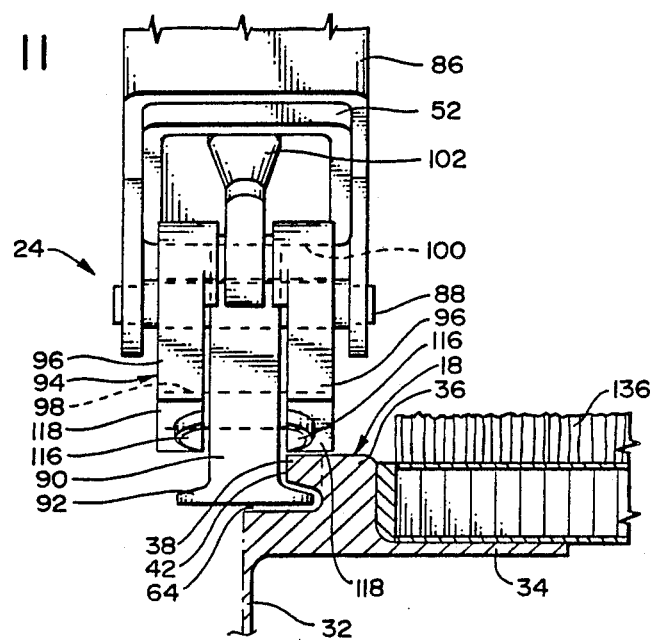
FIG. 11 is a view taken at the location of line 11—11 of FIG. 7, and showing the rear locking member in its unlocked or released position.

Each rear mounting and locking assembly 24 further comprises a track engaging rear wheel 122 which rides on the upper side surface portions of the track 18. This wheel 122 is rotatably mounted in recesses formed in the two bearing sections 56 and 58. Further, each wheel 122 is so positioned that when the locking member 94 is in its locking position so as to slightly raise the foot member 90, the wheel 122 is just out of engagement with the related track 18. However, when the locking member 94 is swung upwardly to its unlocked position, the rear portion of the undercarriage 16 drops just slightly so that the two rear wheels 122 of the two rear mounting and locking assemblies 24 come into load bearing engagement with the two tracks 18. As illustrated in FIG. 11, when the wheels 122 are in engagement with the two tracks 18, the rear retaining feet 92 are positioned in a central unengaged location in the track 18.

Each of the seat rows 12 that has an adjacent forward seat row 12 is connected to that forward seat row 12 by means of a track cover/pitch control assembly 124. Each such assembly 124 comprises a pair of telescoping members, namely a forward member 126 and a rear member 128. The forward member 126 is connected at its forward end 130 to the related retaining foot member 90 of the forward seat row 12. The rear member 128 is connected to the rear seat row 14. (The precise connection of the rear member 128 to the seat row 12 is not specifically illustrated, but this can be a conventional connection, such as with threaded fasteners.)

The precise cross-sectional configuration of the two telescoping members 126 and 128 can vary. As shown in FIG. 2, the forward member 126 comprises a generally flat plate-like cover portion 132 having outer edged portions 134 that overlie an adjacent portion of the carpet 136. Also, the forward member 126 has a downwardly extending flange or web 138 that fits within the openings 42 of the related track 18.

The rear member 128 also has a flat cover portion 140 that overlies the cover portion 132 of the member 126. Further, the edges 141 of the cover portion 140 extend downwardly and around the outer edge portions 134 of the forward member 126 so that the two members 126–128 are secured to one another in telescoping engagement.

The forward member 126 has an upstanding stop member 142 that is adapted to engage a forward stop member 144 that extends a short distance downwardly from the lower surface of the cover portion 140 of the rear member 128. Further, the stop member 142 is arranged to engage a rear stop member 146 that is spaced rearwardly of the forward stop member 144 and also extends downwardly from the cover portion 140 of the rear member 128. These two stop members 144–146 are spaced from one another a distance which permits the two telescoping members 126–128 to move relative to one another to locations corresponding to the minimum pitch (i.e. spacing) and maximum pitch of the adjacent seat rows 12.

As can be seen in FIG. 2, the upper surface of the cover portion 132 of the forward telescoping member 126 is provided with a number of spaced markings 148, with the distance between the markings 48 being equal to the distance between adjacent circular track openings 40. These markings 148 are so spaced and positioned, that when one of the seat rows 12 is at a location where the locking member 94 of the two mounting and locking assemblies 24 is moved into its locking position, the other seat row 12 can easily be moved into a position where it can be locked in place, by aligning the front edge 150 of each of the rear telescoping members 128 with one of the markings 148.

To describe the operation of the present invention, let it be assumed that the various seat rows 12 are securely mounted to the tracks 18 in their locked or secured positions, with each of the locking and unlocking handles 110 in the up locking position. In this situation, the locking members 94 of the two mounting and locking assemblies 24 of each of the seat rows 12 has been rotated downwardly into its locking position. In that position, the two lugs or locking members 116 engage a related pair of circular track openings 40—40 to prevent any forward or rearward movement of the seat row 12 relative to the track 18. In addition, the locking member 94 of each of the assemblies 24 holds its related retaining foot member 90 in an upwardly pressed position so that the feet 92 are pressed upwardly against related lips 38 of the track 18. This arrangement prevents any "rattling" of the rear mounting and locking assembly 24.

Let it now be assumed that the aircraft in which the seat rows 12 are mounted has reached a destination and has unloaded. Let it be further assumed that it is desired to change the spacing of the seat rows 12 by moving these seat rows 12 more closely together. This is accomplished in the following manner. First, each of the handles 110 of the seat rows 12 which are to be moved is rotated downwardly to the release position. (If each of the handles 110 is held in place by a key operated lock, the airplane attendant simply unlocks each of the handles 110.)

When the handle 110 is rotated downwardly to its unlocked position, this in turn pulls the two actuating rods 102 that are operated by that handle 110 upwardly and forwardly so as to lift each of the related locking members 94 upwardly to the release or unlocked position. In that position, the plugs or locking members 116 are moved out of engagement with the openings 40 of the two tracks 18. At the same time, the movement of the locking members 94 permits the rear portion of the undercarriage 16 to drop slightly so that the two rear wheels 122 come into load bearing engagement with the two tracks 18. With this being accomplished, each seat row 12 is supported by the two forward traction wheels 66 and the two rear wheels 122. This permits each of the seat rows 12 that are unlocked to be rolled forwardly or rearwardly along the tracks 18.

If the power unit 76 is to be used to move the seat rows, then the drive member 82 is inserted into the slot 74, and the unit 76 is operated to rotate the two traction wheels 66 either clockwise or counterclockwise. Since the lugs 68 of the traction wheels 66 are in positive engagement with the circular openings 40—40 of the two tracks 18, and since the two traction wheels 66 of each seat row 12 are fixedly interconnected by the shaft 70, the rates of travel of the two sides of the seat row 12 relative to each of the tracks 18 are equal (i.e. there is no skewing of the alignment of the seat row 12).

Since the track cover/pitch control assemblies 124 are capable of only limited telescoping movement, when interconnecting assemblies 124 reach their end limit of travel, they will automatically cause the next adjacent seat row 12 to be moved along with the seat row 12 that is being moved. Thus, in the event that the seats are being moved more closely together for more dense passenger loading, it would be necessary only to move the seat at the extreme forward or rear end in the appropriate direction, so that this would cause other seat rows 12 to move also as the respective telescoping assemblies 124 reach their end limits of travel.

When one of the seat rows 12 has reached a desired location, then that particular seat row 12 is locked in place by properly aligning the seat row 12 relative to the openings 40—40 in the tracks 18. Then the handle 110 of that seat row 12 is lifted upwardly to cause the related locking members 94 to rotate downwardly to cause the plugs 116 to move into locking engagement with the related openings 40—40. Then each additional seat row 12 can be moved into the precise position for locking to the tracks 18 by aligning the front edge 150 of the rear telescoping member 128 with the appropriate marking 148. Since the two traction wheels 66 of each seat row 12 insure that the seat row 12 is properly aligned relative to the tracks 18 at all times, both of the rear mounting and locking assemblies 24 will automatically be properly located relative to the tracks 18 when one of the assemblies 24 is properly located.

When the seat rows 12 have all been placed in the proper positions, and all of the handles 110 have been moved into the upper locking position, these handles 110 are in a convenient out of the way location. Further, the sections of the tracks 18 that are positioned between adjacent seat rows 12 are automatically covered by the telescoping cover members 126 and 128 of the track cover/pitch control assemblies 124. Further, the location of each shaft 70 is such that it acts as a luggage bar to locate any luggage that is placed under the seat.

Figure 12:
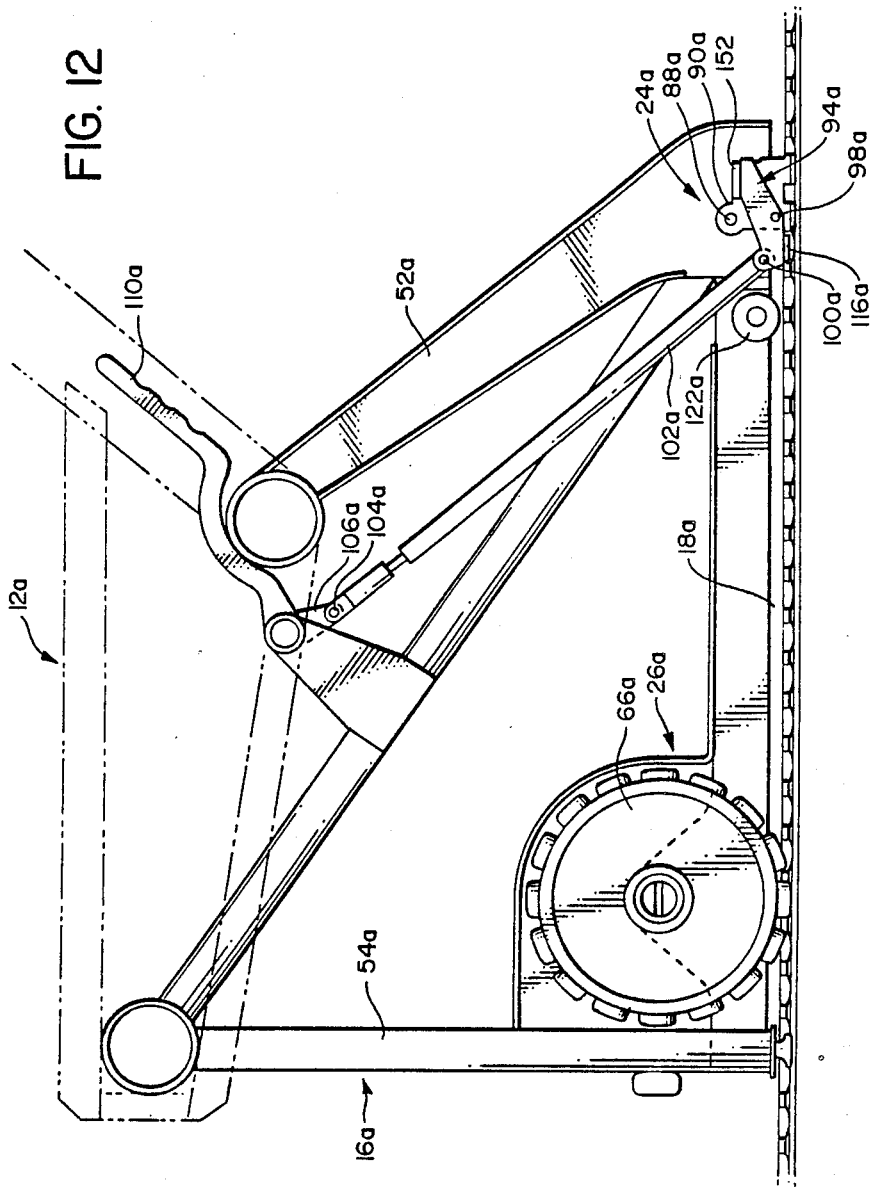
FIG. 12 is a view similar to FIG. 5, looking at an undercarriage in side elevational view, and showing a second embodiment of the present invention, with the rear locking member in its locked position.
Figure 13:
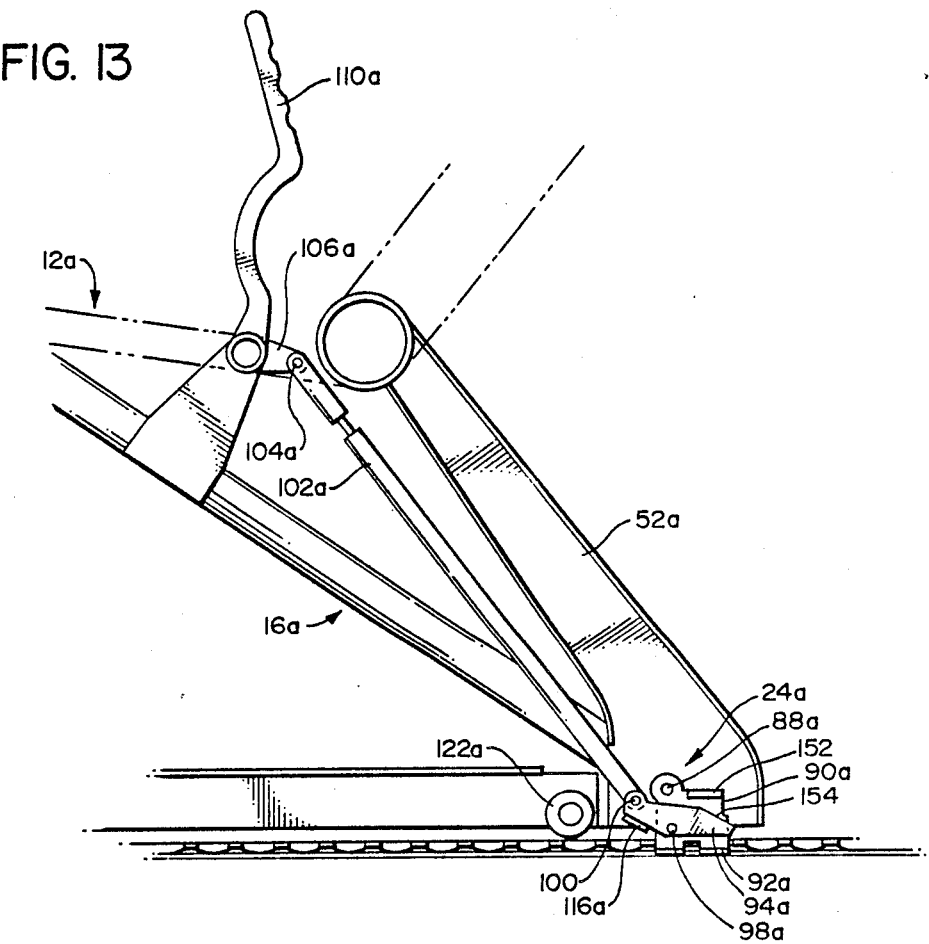
FIG. 13 is a view similar to FIG. 12, showing the rear locking member of the second embodiment in its release position.

Reference is now made to FIGS. 12-13 which show a second embodiment of the present invention. In this second embodiment, components which are similar to components of the first embodiment will be given like numerical designations with an "a" suffix distinguishing those of the second embodiment. Thus, there is illustrated an undercarriage 16a of a seat row 12a having a pair of front legs 54a and a pair of rear legs 52a. There are two forward traction wheels 66a, each engaging a related track 18a.

The main difference in this second embodiment is the particular arrangement of the two rear mounting and locking assemblies 24a. Each assembly 24a has a related retaining foot member 90a that is connected at 88a to its related rear leg 52a. In addition, each member 90a has a flange or plate 152 located at an upper rear portion of its related retaining member 90a.

The locking member 94a has a forward pivot connection at 100a to the actuating rod 102a, and the retaining member 94a is pivotally connected at 98a to its related retaining member 90a at 98a which is rearward of the pivot connection 100a. The locking plugs 116a of each locking member 94a are at the forward portion of the locking member 94a.

When the handle 110a is rotated downwardly and rearwardly to the position of FIG. 12, this causes the rod 102a to push the pivot location 100a downwardly, and cause a rear upwardly facing surface 154 of the locking member 94a to move upwardly to come into engagement with the flange 152 of the retaining member 90a. This engagement of the surface 154 with the flange 152 causes a slight upward movement of the retaining member 90a so that its related feet 92a are pushed upwardly against the upper lip portions of the track 18a. In addition, the contour of the lower surface of the member 94a acts as a lifting cam to raise the member 90a. Thus, the "anti-rattling" is accomplished by moving the lever 110a down to its locking position, which in addition to causing proper locking engagement of the lugs 16a also causes the proper anti-rattling engagement of the surface 154 with the flange 152.

With regard to the detailed configuration of the rear mounting and locking assembly 24a, the detailed construction can be in general similar to that of the assembly 24 of the first embodiment. Thus, it would be practical to form the locking member 94a as two side plates fitting on opposite sides of the retaining member 90a.

Figure 14:
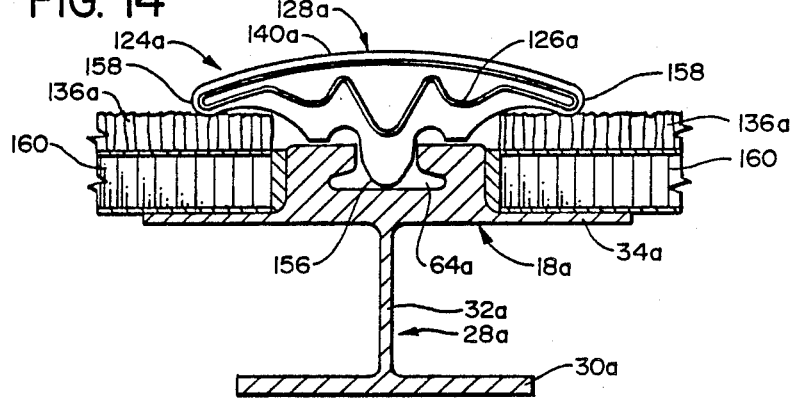
FIG. 14 is a cross-sectional view along a line transverse to a lengthwise axis and illustrating a modified version of the telescoping track cover of the present invention.

With reference to FIG. 14, there is shown a somewhat modified version of the track cover/pitch control assembly 124, and this is designated in FIG. 14 as 124a. In this arrangement, the rear telescoping member 128a, in addition to having the upper cover portion 140a, also has a lower portion 156 which fits into the passageway 64a of the track 18a. Also, the outer portions 158 of the telescoping member 128a extend over the carpet 136a. As shown herein, the carpet 136a lies on the top surface of the floor structure 160.

The forward member 126a has in general the same overall structure as that of the member 126 of the first embodiment. It is to be understood that this assembly 124a of FIG. 14 is provided with the appropriate stop members to limit the telescoping travel of the two members 126a and 128a. Further, the member 126a can be provided with the appropriate markings so that the telescoping members 126a and 128a can be properly positioned so that the seat rows 12a would be in proper position for locking engagement to the tracks 18a.

Figure 15:
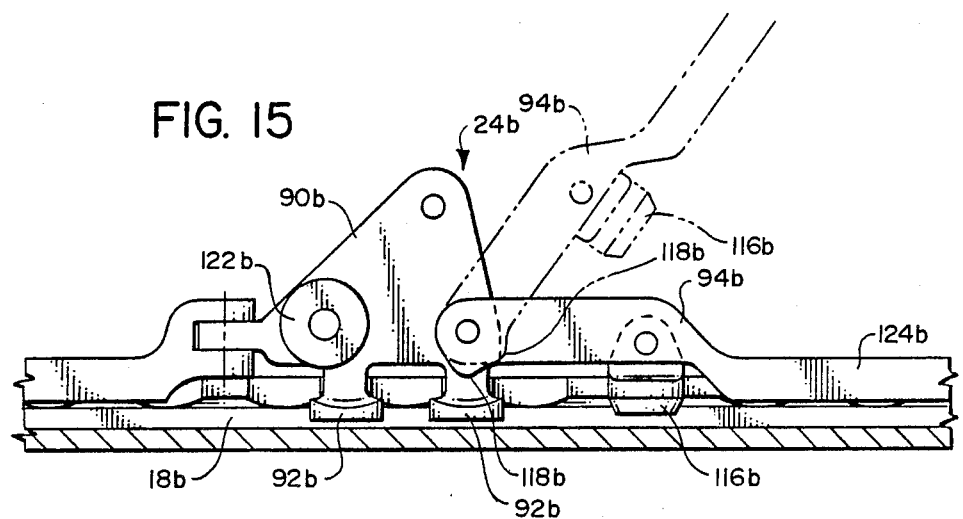
FIG. 15 is a side elevational view showing a further embodiment where the track cover member functions as a lever to move the locking member into and out of locking engagement.

A further embodiment of the present invention is illustrated in FIG. 15. Components which are similar to components of the earlier embodiment will be given like numerical designation, with a "b" suffix distinguishing those of the embodiment of FIG. 15.

In this embodiment of FIG. 15, there is a mounting and locking assembly 24b having a retaining foot member 90b with two retaining feet 92b. There is a locking member 94b having a locking element or plunger 116b that fits in a matching opening in the track 18b. Further, the locking member 94b has a lower cam surface 118b which engages the upper surface of the track 18b to lift the retaining foot member 90b so as to bring the retaining feet 92b into firm engagement with the track 18b. As shown in FIG. 15, with the locking member 94b in its locking position, the cam surface 118b is almost directly below the pivot connection 98b of the locking member 94b to the retaining foot member 90b.

In this embodiment of FIG. 15, instead of operating the locking member 94b by means of an actuating rod, this locking member 94b is attached to a track cover member 124b. In this particular arrangement, the track cover member 124b has generally the same overall configuration as the forward telescoping member 126 of the first embodiment. However, the track cover member 124b is not made as a telescoping member. To accommodate for the different spacing between the seat units, the swing end of the track cover member 124b can be made with a flexible end portion or possibly a hinge mounted swing end portion. Thus, when the pitch (i.e. spacing) of the seat units is smaller, the flexible end of the cover member 124b could be deflected upwardly and attached to the related forward leg of the seat row.

To describe the operation of the embodiment of FIG. 15, when it is desired to move one or more of the seat rows, the cover members 124b are rotated upwardly to bring the locking members 94b out of locking engagement with the tracks 18b. After the seat units are rolled to the desired location, then the track cover members of the seat unit that was moved are moved down into their track engaging positions, with this motion also bringing the locking members 94b into locking engagement. In other respects, the operation of this embodiment of FIG. 15 is substantially the same as described above with respect to the other embodiments.

A fourth embodiment of the present invention will now be described with reference to FIGS. 16 through 24.

The seating system of this fourth embodiment, generally designated 210, comprises comprises a number of seat rows 12 (only one of which is shown), made up of a plurality of seats (one of which is indicated partially in broken lines at 214). Each row of seats 214 has an undercarriage 216 having front legs 218 and rear legs 220, these rear legs 220 being suitably curved for passenger convenience. Reinforcing bracing, such as the brace shown at 222, is employed to add strength and rigidity to the undercarriage 216. The lower end of each forward leg 218 is joined to the lower end its related rear leg 220 by a lower spreader bar 224 which keeps the lower ends of these legs 218 and 220 properly spaced from one another and also adds structural strength and rigidity.

As can be seen in FIGS. 18 and 19, each of these spreader bars 224 has in cross section a modified "T" cross section, where there is an upper horizontal flange 226, a vertical web 228 extending downwardly from the middle of the flange 226, and a laterally extending flange 230. As can be seen in FIGS. 18 and 19, the right and left spreader bars 224 have the flanges 230 extending toward each other. A cover member 232 is removably positioned over each spreader bar 224, with each such cover member 232 having in cross section a hat shaped configuration, so that there is an upper horizontal portion 234, two depending side flanges 236, and two lips 238 which extend outwardly from the lower edges of the flanges 236.

Figure 16:
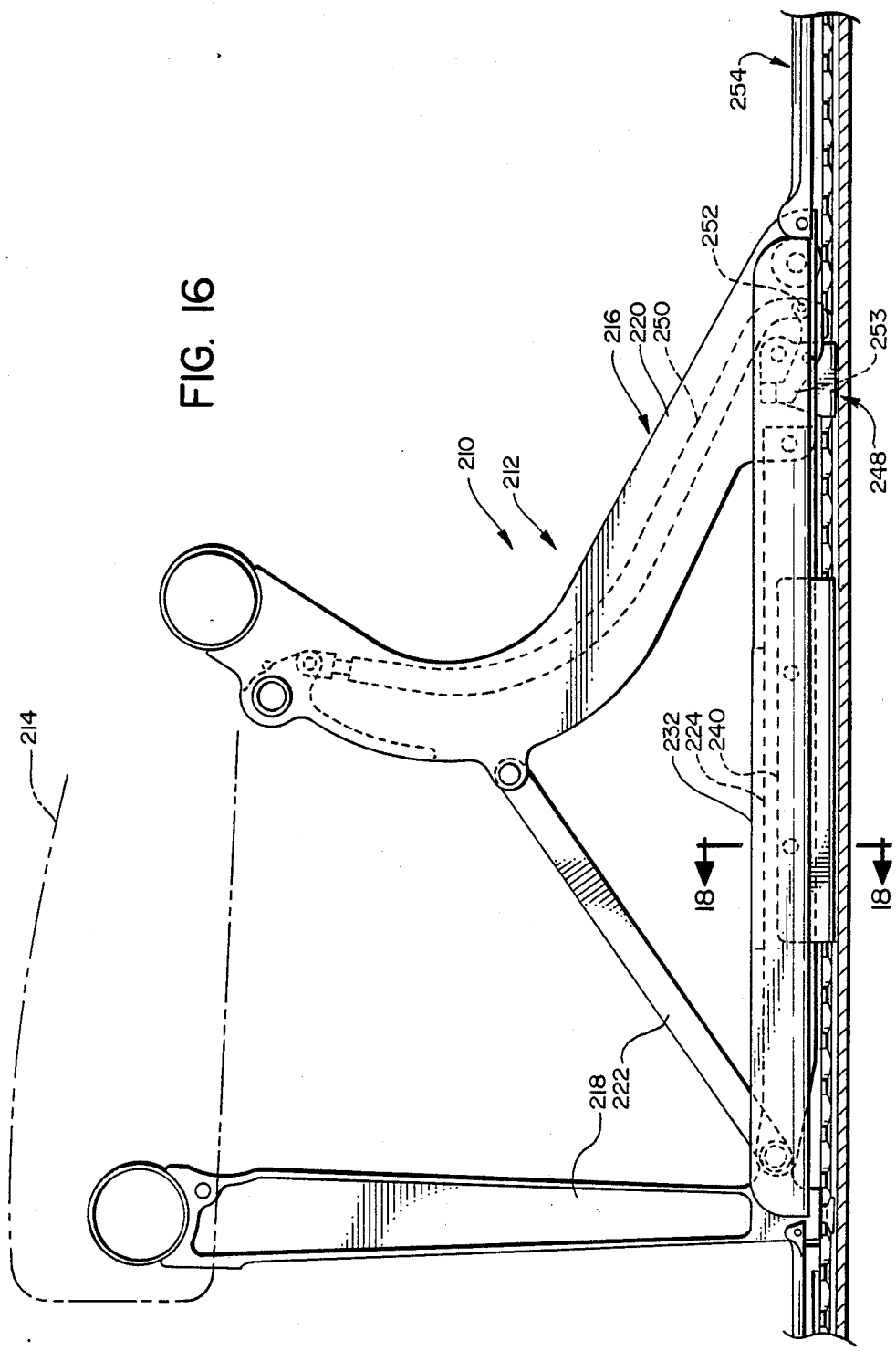
FIG. 16 is a side elevational view of the undercarriage of an undercarriage of a seat row of a fourth embodiment of the present invention, with the mounting and locking assembly in the locked position.
Figure 17:
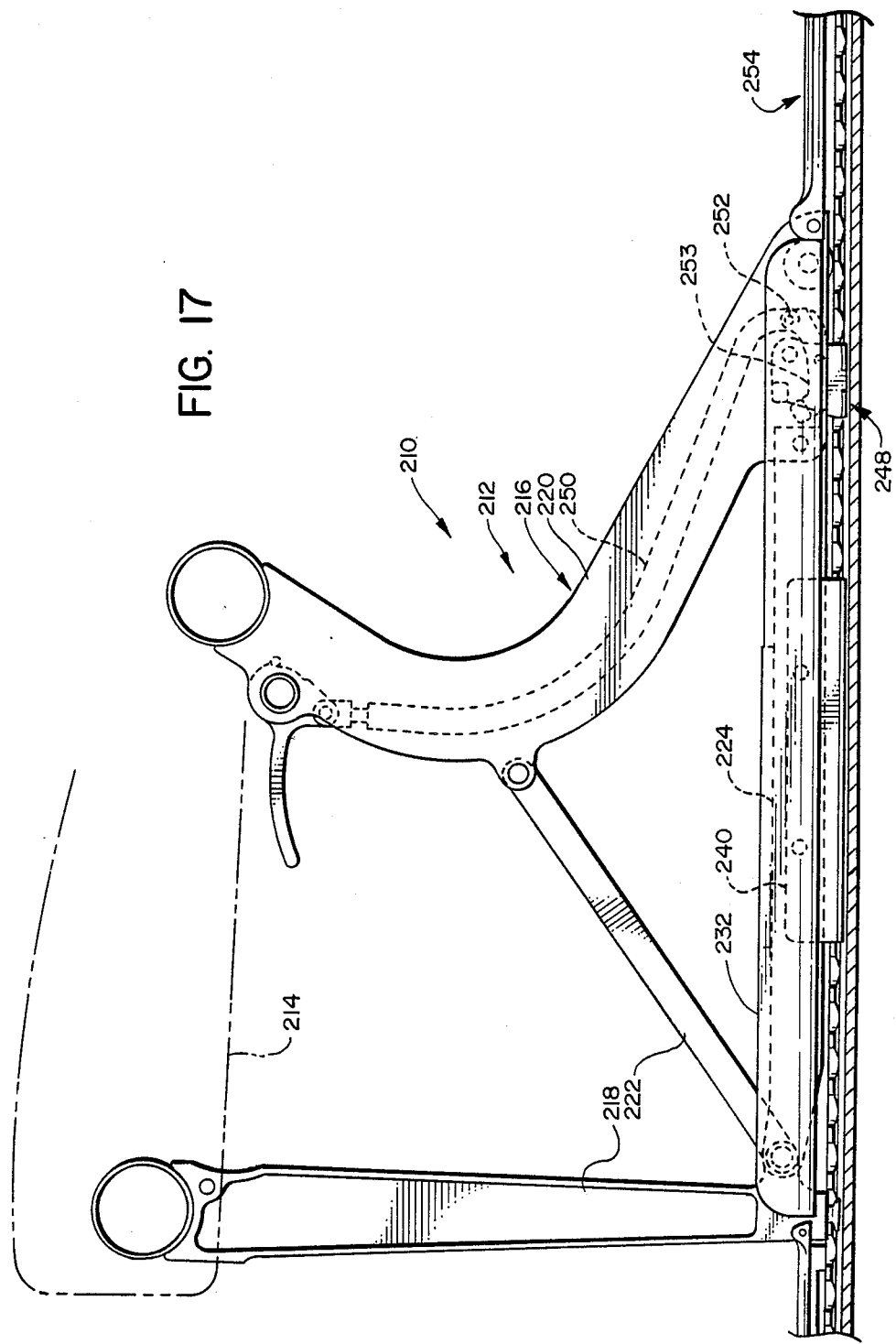
FIG. 17 is a view similar to FIG. 16, but with the mounting and locking assembly in its unlocked position.

A significant feature of this fourth embodiment is the use two anti-derailment bars 240, each of which has in cross section a right angle configuration. More specifically, each bar 240 comprises a vertical flange 242 which is rigidly attached to the web 228 of its related spreader bar 224 by nut and bolt connections 244. At the lower edge of each flange 242, there is a laterally extending retaining lip 246 which in the installed position reaches beneath an adjacent flange 28 which is formed in the previously described track member 18. As can be seen in FIGS. 16 and 17, the two anti-derailment bars 240 extend along a substantial portion of its related spreader bar 224. Thus, the anti-derailment bars not only serve the function of preventing the seat row 212 from lifting out of the tracks 18, but also serve an alignment function to keep the seat rows 212 properly oriented as they are moved forwardly and rearwardly along the tracks 18.

The manner of installing the seat row 212 to the tracks 18 while using the anti-derailment bars 240 is illustrated in FIGS. 18 and 19. One of the derailment bars 240 can remain substantially permanently attached to its related spreader bar 224, with the other anti-derailment bar 240 being removed for purposes of installation. The seat row 212 is tilted laterally so that the attached anti-derailment bar can be slipped into the slot defined by the related track 18, with the retaining lip 246 fitting beneath the flange 38 of the track 18.

The opposite anti-derailment bar 240 is positioned as follows. Initially, with the second anti-derailment bar 240 being removed from its adjacent spreader bar 224, and the spreader bar 224 and anti-derailment bar 240 are installed separately in the slot of their related track member 18. As shown in FIG. 18, the anti-derailment bar 240 is first installed in the track slot, after which the raised side of the seat row 212 is lowered so that the vertical web is placed into a position adjacent to the anti-derailment bar 240. Then these are bolted together at 244, after which the cover member 232 is put into place. This cover member 232 serves a cosmetic function of covering the various mounting components, and also functions to enclose the track members 18 to prevent debris or the like from dropping into the track slots.

An alternative system of installing these second anti-derailment bars is to first position the seat row 212 as shown in FIG. 19, and then in a tilting or twisting motion move the retaining lip 246 of the unattached anti-derailment bar 240 into the track slot, and then rotate the anti-derailment bar 240 to its appropriate position where it can be connected to the spreader bar 224 by the nut and bolt connection 244. Then the cover member 232 is put into place.

There is at the bottom end of each rear leg 220 a mounting and locking assembly 248 which is quite similar in its structure and function to the mounting and locking assembly 24a of the second embodiment. The mounting and locking assembly 248 of this fourth embodiment differs from the assembly 24a in that the forward and rear ends are reversed, so that an actuating rod 250 is pivotally connected at 252 to the rear end of a locking member 253 of the mounting and locking assembly 248. In other respects, the function of this assembly 248 is similar to the previously described mounting and locking assembly 24a except that the forward and rear ends are reversed.

In this fourth embodiment, there are track cover/pitch control assemblies 254 which are somewhat similar in configuration to the assembly 124a shown in FIG. 14. Each such assembly 254 comprises a forward outer telescoping member 256 and a rear inner telescoping member 258. As can be seen in FIG. 22, the forward outer telescoping member 256 comprises in cross sectional configuration a top plate portion 260 having rounded edges 262 which lead into inwardly and downwardly extending wall portions 264 to join to a lower horizontal plate portion 266. Two elongate locating flanges 268 extend downwardly from the lower plate portion 266 to fit into the slot of its related track 18. These two locating flanges 268 serve an aligning and locating function so that the telescoping members 256 and 258 help maintain the adjacent seat rows 212 in proper alignment.

The inner telescoping member 258 comprises an upper plate portion 270 having a contour matching that of the upper plate portion 260 and fitting closely adjacent thereto. There are three spacing flanges 272 connected to the plate portion 270 and extending downwardly therefrom to engage the lower horizontal plate portion 266, so that the two telescoping portions engage each other with reasonable snugness.

As in the prior embodiments, the top surface of the plate portion 270 of the inner telescoping member 258 has thereon spaced markings 274, with the distance between the markings 148 being equal to the distance between adjacent circular track openings 40. These markings 274 are so spaced and positioned that when one of the seat rows 212 is at a location where its associated locking and mounting assemblies 248 are at a locking location, the adjacent seat row 212 can easily be moved into a position where it can be locked in place by aligning the rear edge 276 of the forward outer telescoping member 256 with a selected one of the markings 274. This permits the airline using this system to conveniently place the seat rows 212 in the appropriate positions, for example, as business class and tourist class.

The track cover/pitch control assemblies 254 serve essentially three functions. First, they interconnect the seat rows 212 so that if one of the seat rows 212 is pulled, the other seat rows 212 will follow behind. Likewise, if one of the seat rows 212 is pushed, the other seat rows 212 will be pushed along, being understood that these seat rows 212 are in the unlocked position. Second, the markings on the inner telescoping member 258 indicate the proper spacing the seat rows 212. Thus, when one seat row 212 is in place, the proper location of the adjacent seat row 212 can be ascertained by viewing the markings 274 and bringing the edges 276 of the forward telescoping member 256 in proper alignment with the selected marking 274. Third, the telescoping members 256 and 258 serve to cover the tracks 18 so that debris or the like would not become lodged in the track 18.

To limit the telescoping action of the members 256 and 258, appropriate stop members are provided. More specifically, the rear portion of the forward outer telescoping member 256 has two positioning blocks 278 which are attached by screws 280 to the lower horizontal plate 266. The rear inner telescoping member 258 has forward and rearward locating members 282 and 284, respectively, to engage the positioning blocks 248 at the end limits of travel of the two telescoping members 256 and 258. More specifically, when the telescoping members are in their extreme shortened position, as shown in FIGS. 20 and 21, the two positioning blocks 278 come into engagement with the rear locating member 284. Then, as shown in FIGS. 23 and 24, when the telescoping members 256 and 258 are fully extended, the positioning blocks 278 come into engagement with the forward locating member 282. Further, the interengagement of the stop members permits the telescoping members to transmit tension and compression loading in their extended and retracted positions, respectively, so that the seat units can be pulled or pushed by pulling or pushing one of the interconnecting seat units.

The forward end of the forward telescoping member 256 has two forwardly extending ears 286 by which the member 256 is connected (e.g., by means of a pin 288) to the undercarriage 218. These ears 286 are contoured so that these fit closely adjacent to the rear edge of the cover member 232 so as to substantially conceal the tracks 18 and the other operating components which are adjacent to the track 18. In like manner, the rear end of the rear telescoping member 258 has a pair of ears 290 connected by a pin 292 to a forward portion of the undercarriage 216.

It is to be understood that various modifications could be made to the seating system with these various embodiments, and without departing from the basic inventive features thereof.

What is claimed is:

1. An adjustable seating system adapted for use in a passenger vehicle, such as a passenger aircraft, said system comprising:
   a. a track assembly having a longitudinal axis and comprising at least first and second track members;
   b. a plurality of seat units mounted to said track assembly for movement along said longitudinal axis, each seat unit having mounting and locking means to engage said track members in a manner to permit movement of its related seat unit along the track members and to enable the seat unit to be locked at various locations along the track assembly, each seat unit having rear and forward connecting locations adjacent to each of said first and second track members;

c. each adjacent pair of seat units having first and second seat connecting and track covering devices, each device comprising:
   (1) a forward cover and connecting member having a forward connecting end connected to a forward one of said seat units at a rear connecting location;
   (2) a rear cover and connecting member having a rear connecting end connected to a rear one of said seat units at a forward connecting location;
   (3) said forward and rear cover and connecting members each extending laterally a sufficient distance to cover its related track member;
   (4) said forward and rear cover and connecting members telescopically interengaging one another so as to be able to be retracted and extended to move said forward and rear connecting ends closer to one another and further from one another;
   (5) said forward and rear cover and connecting members having cooperating stop means to limit retracting and extending movement of said forward and rear cover and connecting members so as to resist tension loading in an extended position and to resist compression loading in a retracted position;
   whereby each pair of seat units can be moved further from or closer to one another along said track assembly for greater or lesser seat spacing distance, and a plurality of seat units can be moved along said track assembly by moving one seat unit and causing other seat units to be moved by said cover and connecting devices either pushing or pulling other seat units.

2. The system as recited in claim 1, wherein at least one of the first and second seat connecting and track covering devices has indicia thereon indicating spacing distance between adjacent seat units, whereby spacing of said adjacent units can be ascertained by observing said indicia and properly positioning the cover and connecting members in accordance with the indicia.

3. The system as recited in claim 2, wherein one of said cover and connecting members is an inner cover and connecting member which fits telescopically within an outer one of said cover and connecting members, and said indicia are on said inner cover and connecting member.

4. The system as recited in claim 3, wherein an end edge portion of said outer cover and connecting member is arranged relative to said indicia, so that said end edge portion is positioned adjacent to a portion of said indicia indicating spacing distance of adjacent seat units.

5. The system as recited in claim 1, wherein the seat units of said system have preselected minimum and maximum spacing distances, and said stop means is arranged so that when the seat connecting and track covering devices are at maximum extension, adjacent seat units are at maximum spacing distance, and when the seat connecting and track covering devices are fully retracted, said seat units are at minimum spacing distance.

6. The system as recited in claim 1, wherein at least one of said cover and connecting members has downwardly extending locating flange means adapted to fit in a longitudinal recess in its related track member and extend longitudinally along said recess so as to facilitate alignment of said device along said track member.

7. The system as recited in claim 6, wherein said forward and rear cover and connecting members each have laterally extending edge portions of less vertical dimension adapted to extend beyond edge portions of said track member, and also have central portions of said cover and connecting members which have greater vertical dimension so as to be closely adjacent to said track member.

8. The system as recited in claim 1, wherein said forward and rear cover and connecting members each have laterally extending edge portions of less vertical dimension adapted to extend beyond edge portions of said track member, and also have central portions of said cover and connecting members which have greater vertical dimension so as to be closely adjacent to said track member.

9. The system as recited in claim 1, wherein one of said cover and connecting members is an outer telescoping member and the other of said cover and connecting members is an inner telescoping member adapted to extend telescopically within said outer cover and connecting member, said outer telescoping member substantially enclosing a portion of said inner telescoping member positioned therein, said outer telescoping member having enclosing edge portions which substantially enclose inner edge portions of said inner telescoping member, said outer telescoping member having a lower central portion positioned vertically below said enclosing edge portions of the outer telescoping member, said inner telescoping member having downwardly extending positioning means engaging a lower central portion of said outer telescoping member to provide proper interfit of said outer and inner telescoping members.

10. The system as recited in claim 1, wherein each of said seat units comprises an undercarriage, and each undercarriage comprises a first and second anti-derailment bar means positioned adjacent to said first and second tracks, respectively, each anti-derailment bar means having a lower laterally extending retaining lip positioned to engage a matching flange means of said track member to limit upward movement of said seat unit relative to the track member which the related anti-derailment bar engages.

11. The system as recited in claim 10, wherein each anti-derailment bar means has a substantial lengthwise dimension and engages its related track along a substantial lengthwise distance thereof, whereby in addition to performing a retaining function, said anti-derailment bar means facilitates alignment of said seat unit with said track members.

12. The system as recited in claim 10, wherein:
   a. each track member comprises:
      (1) a pair of laterally spaced flange members comprising said flange means, and extending along the lengthwise axis and reaching laterally toward one another to form a related track passageway which extends along the lengthwise axis of the track;
      (2) the two flange members of each track being formed with lateral recesses which provide enlarged opening which are positioned at regularly spaced intervals along said lengthwise axis, with the enlarged openings being interconnected by narrower openings defined by related retaining flange portions between related adjacent pairs of the enlarged openings;

b. each seat unit has at least two mounting and locking assemblies, each of which operatively engages a related one of the two track members, with each mounting and locking assembly comprising:
  (1) a retaining foot member connected to said seating unit and having at least one foot positioned within the track passageway of its related track member, said foot member being adapted to engage selected related retaining flange portions of its related track member;
  (2) a locking member having a locking element to prevent fore and aft movement of said mounting and locking assembly;
  (3) said locking member being arranged relative to said retaining foot member so that with the locking member in its locking position, the foot member is positioned beneath at least one of said retaining flange portions;

c. said anti-derailment bar means being arranged with a sufficient lengthwise dimension so that when the foot member is at a position adjacent an enlarged opening so as to be removable from said track member, said anti-derailment bar means is positioned to engage the track member to prevent upward release movement of the seat unit from the track member.

13. An adjustable seating system adapted for use in a passenger vehicle, such as a passenger aircraft, said system comprising:
  a. a track assembly having a longitudinal axis and comprising at least two track members, each having a related lengthwise axis parallel to the longtitudinal axis, with each track member comprising:
    (1) a pair of laterally spaced flange members extending along the lengthwise axis and reaching laterally toward one another to form a related track passageway which extends along the lengthwise axis of the track member;
    (2) the two flange members of each track member being formed with lateral recesses which provide enlarged openings which are positioned at regularly spaced intervals along said lengthwise axis, with the enlarged openings being interconnected by narrower openings defined by related retaining flange portions positioned between related adjacent pairs of the enlarged openings;
  b. a plurality of seat units mounted to the track assembly along the longitudinal axis;
  c. each seat unit having at least two mounting and locking assemblies, each of which operatively engages a related one of the two track members, each mounting and locking assembly comprising:
    (1) a retaining foot member connected to said seating unit and having at least one foot positioned within the track passageway of its related track member, said foot being adapted to pass vertically through enlarged openings of the track member at a release position, and to be retained by the flange members of the track member at the narrower openings at a retaining position,
    (2) a locking member having a locking element to fit in said enlarged openings of the track member to prevent fore and aft movement of the mounting and locking assembly;
    (3) said locking member being arranged relative to said foot member so that with the locking member in its locking position, the foot is positioned beneath at least one of said retaining flange portions at the narrower opening;
  d. each seat unit having an undercarriage with first and second anti-derailment bar means to engage said first and second track members, respectively, each anti-derailment bar extending into the passageway of its related track member and having at a lower edge portion thereof a laterally extending retaining lip positioned to engage at least one of flange members of its related track member to restrain upward movement of the seat unit relative to its related track member, said anti-derailment bar means being arranged so that with its related foot member in said release position, said anti-derailment bar means engages at least one of flange members to restrain upward movement of the seat unit.

14. The system as recited in claim 13, wherein the retaining lips of the first and second derailment bar means extend oppositely to one another.

15. The system as recited in claim 14, wherein said retaining lips of the first and second anti-derailment bar means extend laterally outwardly away from one another.

16. The system as recited in claim 13, wherein each of said anti-derailment bar means has a lengthwise dimension and extends in its related passageway along a substantial length thereof so as to perform an aligning function for said seat unit relative to said track assembly.

* * * * *